US011815334B2

(12) United States Patent
Mikroulis

(10) Patent No.: US 11,815,334 B2
(45) Date of Patent: Nov. 14, 2023

(54) FIREARM OPTICAL SIGHT RETICLE

(71) Applicant: Dimitri Mikroulis, Henderson, NV (US)

(72) Inventor: Dimitri Mikroulis, Henderson, NV (US)

( * ) Notice: Subject to any disclaimer, the term of this patent is extended or adjusted under 35 U.S.C. 154(b) by 14 days.

(21) Appl. No.: 17/473,902

(22) Filed: Sep. 13, 2021

(65) Prior Publication Data

US 2022/0082354 A1      Mar. 17, 2022

Related U.S. Application Data

(60) Provisional application No. 63/078,132, filed on Sep. 14, 2020.

(51) Int. Cl.
  *F41G 1/38*   (2006.01)
  *G02B 27/32*  (2006.01)

(52) U.S. Cl.
  CPC ............... *F41G 1/38* (2013.01); *G02B 27/32* (2013.01)

(58) Field of Classification Search
  CPC ............ F41G 1/38; F41G 1/473; G02B 27/32
  USPC ................................... 42/122, 130
  See application file for complete search history.

(56) References Cited

U.S. PATENT DOCUMENTS

| 3,392,450 | A | 7/1968 | Herter et al. |
| 6,032,374 | A | 3/2000 | Sammut |
| 7,100,320 | B2 | 9/2006 | Verdugo |
| 7,603,804 | B2 | 10/2009 | Zaderey et al. |
| 7,877,886 | B1 | 2/2011 | Hamilton |
| D684,653 | S | * 6/2013 | Smith ............... F41G 1/00 D22/109 |
| D700,944 | S | 3/2014 | Mikroulis |
| D700,945 | S | 3/2014 | Mikroulis |
| D716,409 | S | 10/2014 | Mikroulis |
| D720,033 | S | 12/2014 | Mikroulis |
| 8,910,412 | B2 | 12/2014 | Mikroulis |
| 8,959,824 | B2 | * 2/2015 | Sammut ............... F41G 1/473 42/130 |
| D726,280 | S | * 4/2015 | Mikroulis ............... F41G 1/00 D22/109 |
| 9,068,799 | B1 | 6/2015 | Wu |
| D745,105 | S | 12/2015 | Mikroulis |

(Continued)

OTHER PUBLICATIONS

PCT Notification of Transmittal of the International Search Report and the Written Opinion of the International Searching Authority, or the Declaration; Jan. 21, 2022; International Application No. PCTUS21/50136; International Searching Authority, United States Patent and Trademark Office.

(Continued)

*Primary Examiner* — Joshua E Freeman
*Assistant Examiner* — Benjamin S Gomberg
(74) *Attorney, Agent, or Firm* — The Compton Law Firm, P.C.; Scott D. Compton

(57) ABSTRACT

The present disclosure is directed to a reticle for an optical sight of a projectile launching device. A reticle of the present disclosure is graduated in angular measurement and operationally configured as an exact firing solution using ballistic data and operationally configured for target auto ranging, bullet drop compensation and target auto leading at one or more incremental distances. A reticle of the present disclosure is also operationally configured for use with one or more firearm/ammo combinations zeroed at one or more distances.

14 Claims, 22 Drawing Sheets

(56) References Cited

U.S. PATENT DOCUMENTS

| | | |
|---|---|---|
| D767,077 S | 9/2016 | Mikroulis |
| D767,659 S | 9/2016 | Mikroulis |
| 9,435,610 B2 | 9/2016 | Silvers et al. |
| 9,459,077 B2 | 10/2016 | Sammut et al. |
| 10,073,277 B2 * | 9/2018 | Plumb .................... G02B 27/32 |
| D834,629 S | 11/2018 | Mikroulis |
| D850,562 S | 6/2019 | Mikroulis |
| D850,563 S | 6/2019 | Mikroulis |
| D850,564 S | 6/2019 | Mikroulis |
| D850,565 S | 6/2019 | Mikroulis |
| D850,567 S | 6/2019 | Mikroulis |
| D850,569 S | 6/2019 | Mikroulis |
| D865,112 S | 10/2019 | Mikroulis |
| D865,113 S | 10/2019 | Mikroulis |
| D865,114 S | 10/2019 | Mikroulis |
| 10,451,385 B2 | 10/2019 | Sammut et al. |
| D884,819 S * | 5/2020 | Verdugo ................... F41G 1/00 D22/109 |
| 10,648,771 B2 | 5/2020 | Mikroulis |
| D889,588 S * | 7/2020 | Verdugo ................... F41G 1/00 D22/109 |
| D896,914 S | 9/2020 | Mikroulis |
| 2006/0236586 A1 | 10/2006 | Zaderey |
| 2007/0022651 A1 * | 2/2007 | Verdugo ................... F41G 1/38 42/130 |
| 2008/0202011 A1 | 8/2008 | Shepherd |
| 2014/0068993 A1 * | 3/2014 | Mikroulis ................ F41G 3/08 42/122 |
| 2015/0253108 A1 * | 9/2015 | Fischer .................... F41G 3/06 42/122 |
| 2015/0253132 A1 | 9/2015 | Senne |
| 2016/0252325 A1 * | 9/2016 | Sammut ................ G01S 19/13 42/122 |
| 2017/0176141 A1 | 6/2017 | Kedairy |
| 2019/0257618 A1 * | 8/2019 | Mikroulis ................ F41G 1/38 |
| 2020/0072576 A1 * | 3/2020 | Gallery .................. G02B 27/32 |

OTHER PUBLICATIONS

Mikroulis, Claims 1-17 of the International Application No. PCTUS21/50136; Sep. 13, 2021.

Primary Arms, LLC, New 1-8x FFP ACSS Griffin Mil, Youtube.com, Apr. 26, 2019, https://www.youtube.com/watch?v=0yv15Y2ft5g.

Primary Arms, LLC, ACSS HUD DMR .308/.223 reticle tutorial, Youtube.com, Aug. 8, 2014, https://www.youtube.com/watch?v=r0oLPFNWCLE.

PCT International Preliminary Report on Patentability; dated Mar. 7, 2023; International Application No. PCT/US2021/50136; The International Bureau of WIPO; Geneva, Switzerland.

* cited by examiner

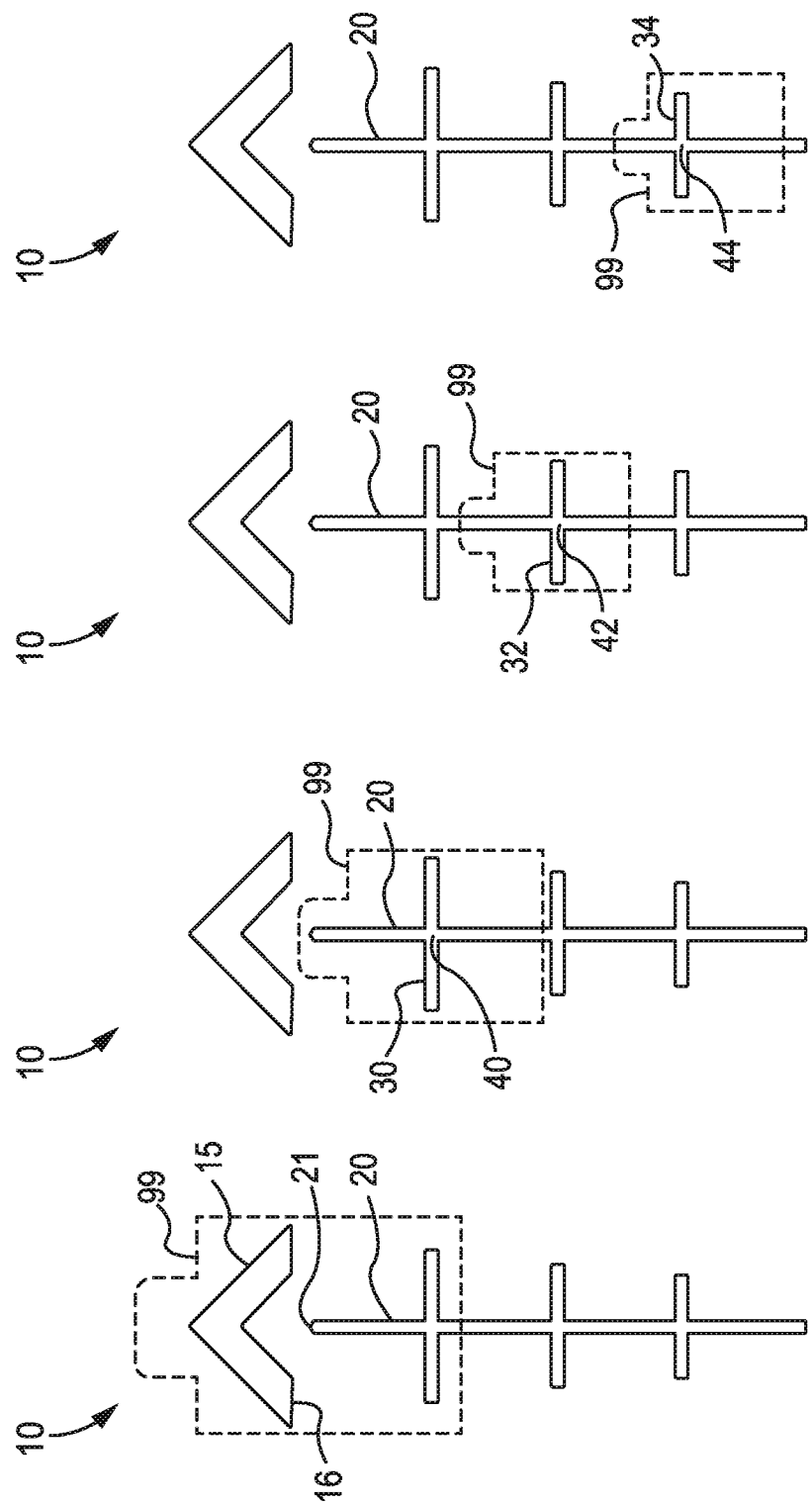

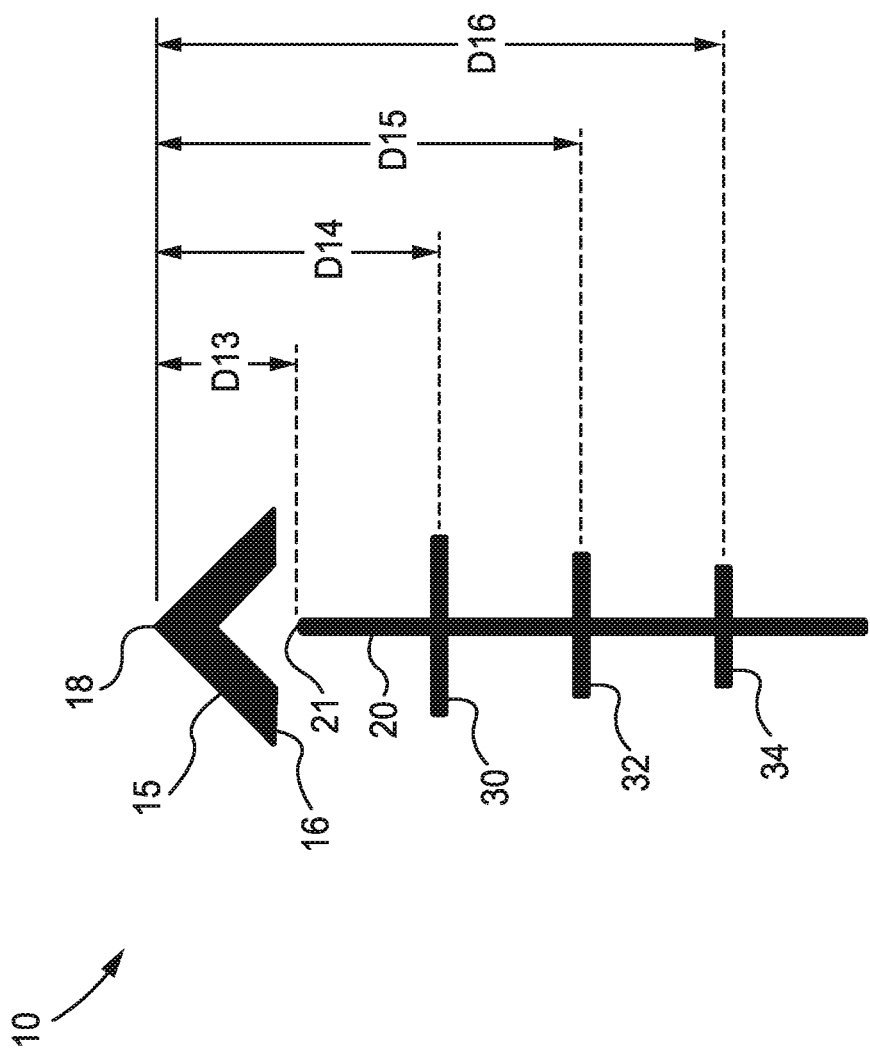

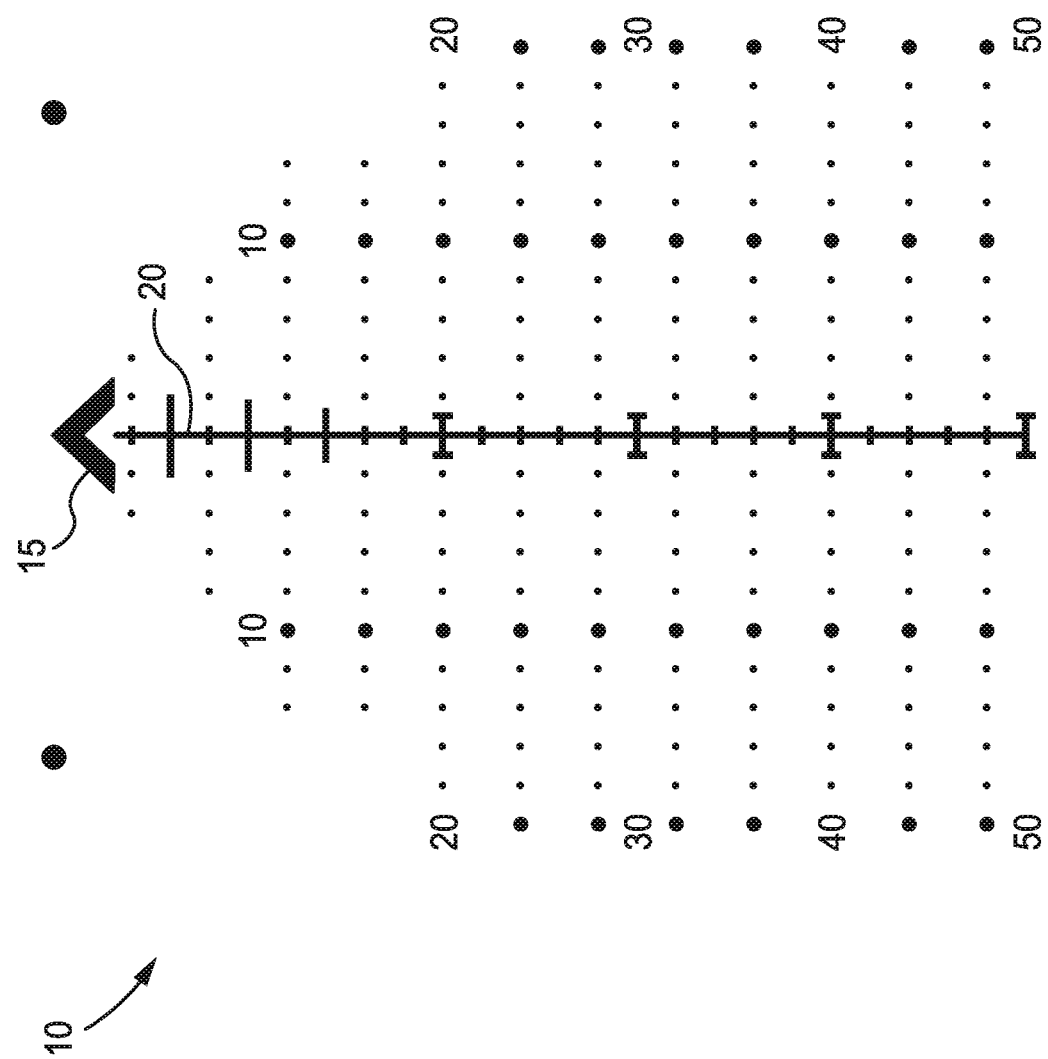

FIREARM OPTICAL SIGHT RETICLE

CROSS-REFERENCE TO RELATED APPLICATIONS

This application claims benefit of U.S. Provisional Patent Application Ser. No. 63/078,132, filed on Sep. 14, 2020, the content of which is hereby incorporated by reference in its entirety.

STATEMENT REGARDING FEDERALLY SPONSORED RESEARCH OR DEVELOPMENT

Not applicable.

BACKGROUND OF THE DISCLOSURE

1. Field of the Disclosure

The present disclosure relates generally in the field of reticles for firearm optical sights.

2. BACKGROUND ART

In firearm shooting performance, accuracy and consistency are valued traits. Accuracy and consistency are typically linked to the skill of a shooter, the construction of a shooter's firearm, the construction of a projectile, e.g., a bullet, used with a shooter's firearm, as well as other factors such as distance to target and windage. Other factors such as Magnus effect, i.e., a lateral thrust exerted by wind on a rotating bullet whose axis is perpendicular to the wind direction, Coriolis effect, and bullet spin may affect a bullet's travel path in space over long range at one or more distances. To assist in target acquisition, a firearm is often equipped with a sight such as an iron sight or an optical sight affixed to the firearm. An optical sight, commonly referred to as a "scope" typically includes a reticle comprising indicia including one or more aiming marks. An aiming mark of a reticle defines an aiming point at which a straight aiming line of sight intersects at a target distance of a bullet's curved trajectory. A bullet, due to its curved trajectory, will intersect an aiming line of sight at one range and pass below or above it at other ranges. Accordingly, elevation adjustments are often employed to adjust the aiming line of sight for intersecting the curved trajectory of a bullet at a particular target distance or "target range."

Reticles for firearm optical sights are known having indicia with aiming marks that assist shooters with range estimation and shooting precision. For example, law enforcement and the military typically use MRAD reticle riflescopes and/or MOA reticle riflescopes. However, MRAD reticle riflescopes and MOA reticle riflescopes do not provide calculation free targeting information such as horizontal and vertical ranging, and bullet drop compensation. In military and law enforcement combat scenarios, individuals typically need to acquire targets quickly without having to perform mathematical calculations. Also, military and law enforcement personnel are sometimes equipped with different types of firearms and/or different cartridges that are zeroed at different distances that may require use of different riflescopes with different reticles, which may hinder communication between personnel.

Other firearm reticles have been developed that provide calculation free targeting information such as horizontal and vertical ranging and bullet drop compensation. However, optical sights equipped with such reticles are not configured as exact firing solutions and/or are limited in their calculation free targeting features. In addition, such firearm reticles include a particular layout of indicia or indicia configuration not suitable or desirable for use by one or more persons.

Overcoming the above shortcomings is desired.

SUMMARY OF THE DISCLOSURE

The present disclosure is directed to a firearm optical sight reticle for use with one or more firearm/ammo combinations zeroed at one or more distances, comprising graduated marks graduated in angular measurement including (1) a point of origin aiming mark; (2) one or more first subtension marks of an incremental subtension value operationally configured as horizontal target auto ranging marks and bullet drop compensation marks at one or more incremental distances; and (3) one or more second subtension marks of the incremental subtension value of the one or more first subtension marks operationally configured as moving target auto ranging marks and moving target lead marks at the one or more incremental distances; wherein one or more of the graduated marks are operationally configured as exact firing aiming marks.

The present disclosure is also directed to a firearm optical sight reticle for use with one or more firearm/ammo combinations zeroed at one or more distances, comprising (1) a point of origin aiming mark; and (2) a first horizontal ranging mark of a first angular measurement subtension value for horizontal auto ranging of a target at a first distance; (3) a second horizontal ranging mark of a second angular measurement subtension value for horizontal auto ranging of the target at a second distance; (4) a third horizontal ranging mark of a third angular measurement subtension value for horizontal auto ranging of the target at a third distance; (5) a fourth horizontal ranging mark of a fourth angular measurement subtension value for horizontal auto ranging of the target at a fourth distance; (6) a grid comprising one or more aiming marks operationally configured as exact firing marks using ballistic data; one or more first moving target auto ranging marks for auto ranging and auto leading the target running at the first distance; one or more second moving target auto ranging marks for auto ranging and auto leading the target running at the second distance; one or more third moving target auto ranging marks for auto ranging and auto leading the target running at the third distance; one or more fourth moving target auto ranging marks for auto ranging and auto leading the target running at the fourth distance; wherein the first horizontal ranging mark and the one or more first moving target auto ranging marks are operationally configured as bullet drop compensation marks at the first distance; wherein the second horizontal ranging mark and the one or more second moving target auto ranging marks are operationally configured as bullet drop compensation marks at the second distance; wherein the third horizontal ranging mark and the one or more third moving target auto ranging marks are operationally configured as bullet drop compensation marks at the third distance; and wherein the fourth horizontal ranging mark and the one or more fourth moving target auto ranging marks are operationally configured as bullet drop compensation marks at the fourth distance.

The present disclosure is also directed to a reticle for a firearm optical sight for use with one or more firearm/ammo combinations zeroed at one or more distances, comprising (1) a primary horizontal crosshair; (2) a primary vertical crosshair; (3) a point of origin aiming mark; (4) a first horizontal crosshair operationally configured as a 1.0

MRAD subtension mark and operationally configured as a bullet drop compensation mark and a horizontal auto ranging mark of one or more targets at a distance of 300.0 yards; (5) a second horizontal crosshair operationally configured as a 2.0 MRAD subtension mark and operationally configured as a bullet drop compensation mark and a horizontal auto ranging mark of the one or more targets at a distance of 400.0 yards; (6) a third horizontal crosshair operationally configured as a 3.0 MRAD subtension mark and operationally configured as a bullet drop compensation mark and a horizontal auto ranging mark of the one or more targets at a distance of 500.0 yards; (7) a fourth horizontal crosshair operationally configured as a 4.0 MRAD subtension mark and operationally configured as a bullet drop compensation mark and a horizontal auto ranging mark of the one or more targets at a distance of 600.0 yards; (8) one or more first target auto ranging marks subtending 1.0 MRAD from the primary horizontal crosshair operationally configured as one or more moving target auto ranging marks, auto lead marks, and bullet drop compensation marks at a distance of 300.0 yards; (9) one or more second target auto ranging marks subtending 2.0 MRAD from the primary horizontal crosshair operationally configured as one or more moving target auto ranging marks, auto lead marks, and bullet drop compensation marks at a distance of 400.0 yards; (10) one or more third target auto ranging marks subtending 3.0 MRAD from the primary horizontal crosshair operationally configured as one or more moving target auto ranging marks, auto lead marks, and bullet drop compensation marks at a distance of 500.0 yards; (11) one or more fourth target auto ranging marks subtending 4.0 MRAD from the primary horizontal crosshair operationally configured as one or more moving target auto ranging marks, auto lead marks, and bullet drop compensation marks at a distance of 600.0 yards; and (12) MRAD aiming marks subtending 1.0 MRAD, 2.0 MRAD, 3.0 MRAD and 4.0 MRAD from the primary horizontal crosshair on either side of the primary vertical crosshair.

BRIEF DESCRIPTION OF THE SEVERAL VIEWS OF THE DRAWING

FIG. 6 is a front view of the reticle of FIG. 3 illustrating horizontal ranging of a target object at a distance of 300.0 yards.
FIG. 7 is a front view of the reticle of FIG. 3 illustrating horizontal ranging of a target object at a distance of 400.0 yards.
FIG. 8 is a front view of the reticle of FIG. 3 illustrating horizontal ranging of a target object at a distance of 500.0 yards.
FIG. 9 is a front view of the reticle of FIG. 3 illustrating horizontal ranging of a target object at a distance of 600.0 yards.
FIG. 10 is another front view of the reticle of FIG. 3.
FIG. 25 is a front view of another embodiment of a reticle of the present disclosure.

DEFINITIONS USED IN THE DISCLOSURE

Figure 1:
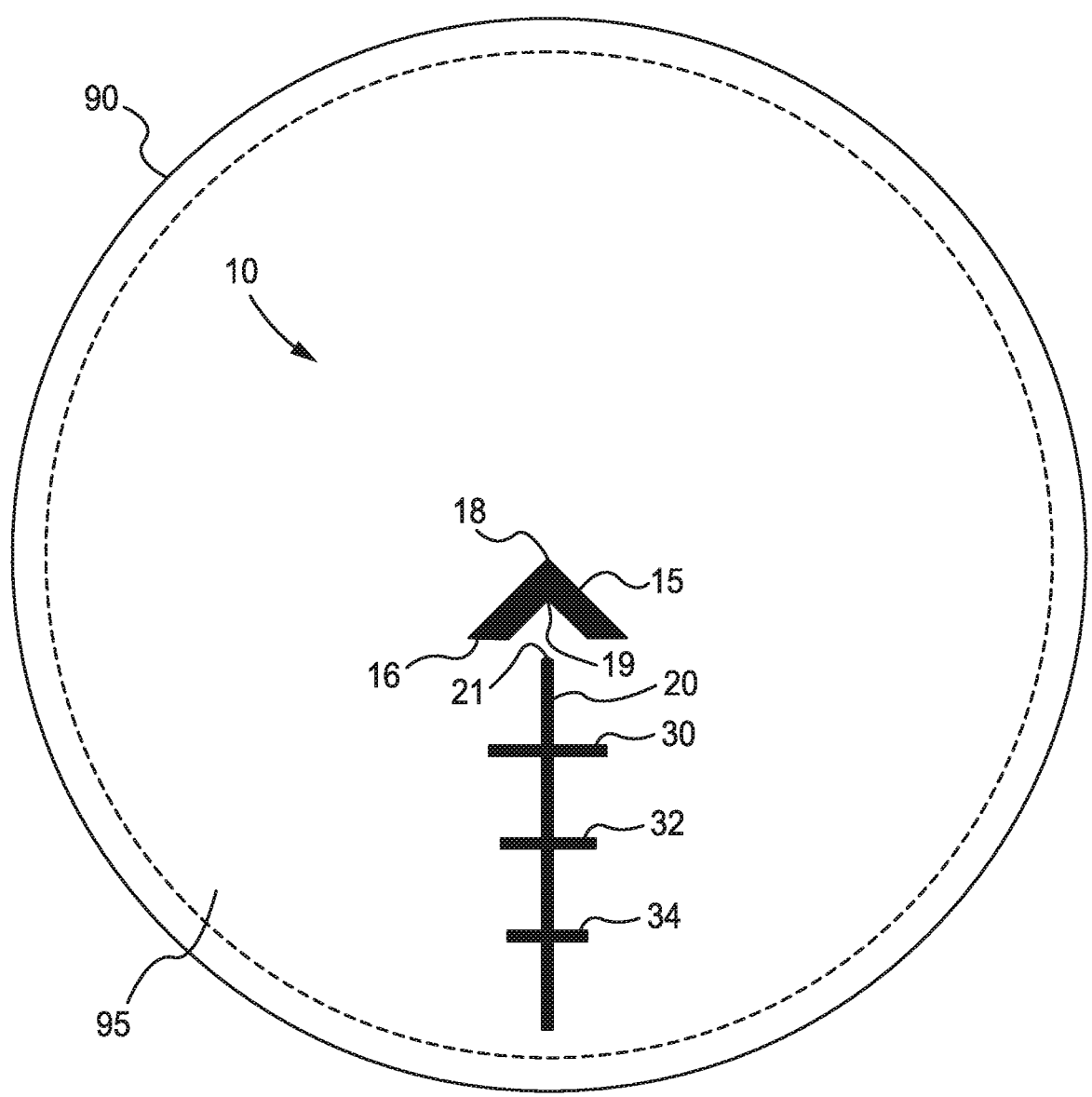
FIG. 1 is front view of an embodiment of a reticle of the present disclosure on a transparent member of an optical sight.

The term "at least one", "one or more", and "one or a plurality" mean one thing or more than one thing with no limit on the exact number; these three terms may be used interchangeably within this application. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

DETAILED DESCRIPTION OF THE DISCLOSURE

For the purposes of promoting an understanding of the principles of the disclosure, reference is now made to the embodiments illustrated in the drawings and particular language will be used to describe the same. It is understood that no limitation of the scope of the claimed subject matter is intended by way of the disclosure. As understood by one skilled in the art to which the present disclosure relates, various changes and/or modifications of the principles as described and illustrated are herein contemplated.

Herein, a "projectile launching device" may include, but is not necessarily limited to a firearm and a crossbow. A "firearm" may include, but is not necessarily limited to a rifle, a shotgun, a pistol, a shoulder fired bazooka, a shoulder fired rocket launcher, an air rifle, and a paintball gun. As understood by the skilled artisan, a particular firearm may be provided in different barrel lengths. The term "optical sight"

may be used interchangeably with the terms "scope," "scope sight," "optical platform" and "telescopic sight." In regard to use with rifles, a scope may also be referred to as a riflescope. In regard to use with pistols, a scope may also be referred to as a pistol scope. Herein, a person using a reticle and a corresponding projectile launching device may be referred to as a "shooter." An optical sight of this disclosure may include a first focal plane optical sight, a second focal plane optical sight, or a dual focal plane optical sight. Non-limiting examples of optical sights are described in United States Patent Application Publication Number 2021/0164758 A1, titled "Riflescope with Optical Aiming Corrector," published on Jun. 3, 2021, which is herein incorporated by reference in its entirety; U.S. Pat. No. 7,411,750 B2, titled "Optical Sight," issued on Aug. 12, 2008, which is herein incorporated by reference in its entirety; U.S. Pat. No. 10,180,565 B2 titled "Viewing Optic with an Integrated Display System," issued on Jan. 15, 2019, which is herein incorporated by reference in its entirety; and U.S. Pat. No. 4,806,007 titled "Optical Gun Sight," issued on Feb. 21, 1989, which is herein incorporated by reference in its entirety.

Herein, a "target object" of a projectile launching device may include an entity (or "animate object") and/or an inanimate object of various sizes and shapes and/or silhouettes. Herein, the term "enemy combatant" may include a human being or a target object having the general size and shape of a human being as understood by persons of ordinary skill in the art of firearm target shooting. In another embodiment, the phrase "enemy combatant" may refer to one or more animals, e.g., game and predators, in hunting applications. One exemplary inanimate enemy combatant target object may include a silhouette having the general size and shape of (1) an adult individual, or (2) a torso of an adult individual, or (3) an upper body of an adult individual including a head and torso as understood by persons of ordinary skill in the art of firearm target shooting. A silhouette of an enemy combatant target object may include a front facing silhouette or a side facing silhouette in relation to a reticle of an optical sight. Herein, the phrases "close-quarters combat," "close combat" and "close-quarters battle" may be used interchangeably to define confrontations involving firearms between two or more persons within a distance up to or about 100.0 meters (109.4 yards). As commonly used in military settings, the term "designated marksman" refers to a military role of a marksman assigned to engage enemy combatants and other target objects at known distances and unknown distances including distances out to or about 600.0 yards (or 600.0 meters), i.e., a "designated marksman role." Herein, the term "target" may be used interchangeably with the term "target object."

Regarding a reticle of this disclosure, the "average center mass" (or "center mass") of a particular target includes a designated width of the target, e.g., the outer shoulder tip to outer shoulder tip (or "shoulder tip to shoulder tip") width of an enemy combatant when directly facing the reticle or when turned 180.0 degrees facing directly away from the reticle. A shoulder tip to shoulder tip orientation of an enemy combatant is herein referred to as a "primary position" of an enemy combatant. The center mass of an enemy combatant suitably includes the torso of an enemy combatant.

Herein, a distance to a target refers to a distance from an optical sight comprising a reticle of this disclosure to a target or the distance between an optical sight comprising a reticle of this disclosure and a target. Herein, the phrase "at a distance of" such as "at a distance of 300.0 yards" refers to a distance between a target and an optical sight comprising a reticle of this disclosure.

The term "mark" is used to define an indicator of a location of a point including, but not necessarily limited to an aiming point on a reticle. Marks of this disclosure may comprise one or more shapes or configurations including, but not necessarily limited to dots, straight lines, closed circles, open circles, triangles, stars, chevrons, bullseyes, diamonds, X-shape marks, "T" shape marks, curved lines, crosses, letters, numbers, arc shapes, solid shapes and silhouette shapes including irregular shapes, and combinations thereof. Herein, the term "dot" need not necessarily be provided in a substantially circular form.

Herein "mph" refers to miles per hour and "mps" refers to meters per second. Herein, "km/h" refers to kilometers per hour and "ft/s" refers to feet per second. The phrase "time on target" refers to the time required for an operator of a projectile launching device, e.g., a firearm user or shooter, to realize the aiming point of a given round to a particular target in real time, i.e., the time required for target acquisition. Herein, rapid or fast time on target is a time of or about 3.0 seconds or less. The terms "automatic" and "auto" may be used interchangeably. The term "auto ranging," and like terms, refers to the ability to range one or more targets with a reticle of the present disclosure without making or using range calculations. The term "auto leading," and like terms, refers to the ability to lead one or more targets with a reticle of the present disclosure without making or using lead calculations. The term "auto bullet drop compensation," and like terms, refers to the ability to identify how far a bullet drops over a given distance without making or using bullet drop calculations. Herein, the act of aiming at a target refers to using a reticle of this disclosure to aim a firearm at a target.

Herein the term "bullet drop" refers to the curved trajectory traversed by a moving projectile or bullet as it falls from its initial trajectory while traveling a distance, i.e., "target range" or "target distance," from a projectile launching device to a target. As understood by the artisan skilled in firearm shooting or "skilled artisan," bullet drop is caused by the influence of gravity on a moving projectile or bullet. Therefore, to hit a target at long range, it is necessary to elevate the barrel of a firearm and the aiming point to compensate for bullet drop. The term "full value wind" refers to wind blowing perpendicular left to right or right to left in relation to a reticle and user thereof, e.g., a cross wind. Using a clock system, full value winds travel "9 to 3" and "3 to 9" in relation to a reticle and user thereof. As also understood by the skilled artisan, the term "full value" in reference to wind means that the force of the wind has a full effect on the flight of a bullet compared to a "half value wind" or "no value wind." As further understood by the skilled artisan, generally, the greater the velocity of wind the greater its force.

Herein, "MIL" or "MRAD" is a shortening of the term milliradian and "MILs" and "MRADs" is a shortening of milliradians. A milliradian is an angular measurement wherein a milliradian is a thousandth of a radian. There are 6.283 radians in a circle, which equates to 6283.0 milliradians in a circle. As understood by persons of ordinary skill in the art of firearm shooting, milliradians are used in the adjustment of firearm sights by adjusting the angle of a sight compared to the barrel of a corresponding firearm. For purposes of this disclosure, "milliradian," "MIL" and "MRAD" can be used interchangeably.

Herein, "MOA" refers to Minutes of Angle, which is an angular measurement wherein one minute of angle is equal to 1/60 of a degree. As understood by the skilled artisan, the term "subtension" refers to the amount of a target that is covered by some part of a reticle. Subtension may be measured in length at a specific distance (inches at a distance in yards) or as an angular measurement in MRAD or MOA. Regarding a reticle of the present disclosure, the term "subtension mark" may be used interchangeably with "angular measurement subtension mark" and may be provided as one or more indicia of a reticle of this disclosure, e.g., as a MRAD subtension mark or as a MOA subtension mark.

In firearm shooting and other projectile targeting activities, it is understood that distances in meters may be converted to yards and vice versa. A non-limiting sampling of conversions for various distances in meters and yards are provided in Tables 1 and 2 below.

TABLE 1

| Distance (in meters) | Distance (in yards) |
|---|---|
| 50.0 | 54.68 |
| 100.0 | 109.36 |
| 150.0 | 164.04 |
| 200.0 | 218.72 |
| 250.0 | 273.40 |
| 300.0 | 328.08 |
| 350.0 | 382.77 |
| 400.0 | 437.45 |
| 450.0 | 492.13 |
| 500.0 | 546.81 |
| 550.0 | 601.49 |
| 600.0 | 656.17 |

TABLE 2

| Distance (in yards) | Distance (in meters) |
|---|---|
| 50.0 | 45.72 |
| 100.0 | 91.44 |
| 150.0 | 137.16 |
| 200.0 | 182.88 |
| 250.0 | 228.6 |
| 300.0 | 274.32 |
| 350.0 | 320.04 |
| 400.0 | 365.76 |
| 450.0 | 411.48 |
| 500.0 | 457.2 |
| 550.0 | 502.92 |
| 600.0 | 548.64 |

As understood by the skilled artisan, 1.0 MRAD at 100.0 yards equals 9.14 cm (3.6 inches), 1.0 MRAD at 200.0 yards equals 18.29 cm (7.2 inches) and so forth as described in Table 3 below out to a distance of 600.0 yards. Likewise, 1.0 MRAD at 100.0 meters equals 10.0 cm and so forth as described in Table 4 below out to a distance of 600.0 meters.

TABLE 3

| Range (in yards) | One MRAD (in cm) | One MRAD (in inches) |
|---|---|---|
| 100.0 | 9.14 | 3.6 |
| 200.0 | 18.29 | 7.2 |
| 300.0 | 27.43 | 10.8 |
| 400.0 | 36.58 | 14.4 |
| 500.0 | 45.72 | 18.0 |
| 600.0 | 54.86 | 21.6 |

TABLE 4

| Range (in yards) | One MRAD (in cm) | One MRAD (in inches) |
|---|---|---|
| 100.0 | 10.00 | 3.94 |
| 200.0 | 20.00 | 7.87 |
| 300.0 | 30.00 | 11.81 |
| 400.0 | 40.00 | 15.75 |
| 500.0 | 50.00 | 19.69 |
| 600.0 | 60.00 | 23.62 |

As also understood by the skilled artisan, the phrase "30 caliber cartridge" may refer to one or more of the .308 Winchester ("0.308"), the .30-30 Winchester, the 7.62×51 mm NATO, the 0.30/06, and the 0.30 Carbine cartridge or round. As understood by persons of ordinary skill in the art of firearm shooting, the .308 Winchester and the 7.62×51 mm NATO round are not identical and the .308 Winchester round is typically loaded to a higher pressure than the 7.62×51 mm NATO round. However, the .308 Winchester and the 7.62×51 mm NATO rounds are similar enough to be loaded into firearms chambered for the other round.

Herein, the .300 Winchester Magnum (or "0.300 Win Mag" or "300WM") refer to the 7.62×67 mm cartridge or round. The terms "5.45" and "5.45 round" refer to the 5.45×39 mm cartridge or round. Herein, the term "7.62 NATO" refers to the 7.62×51 mm cartridge or round. The term "7.62 Soviet" refers to the 7.62×39 mm cartridge or round. The term "6.5 Creedmoor" refers to 6.5×48 mm cartridge or round. The terms "6.5 Grendel" and "6.5 mm Grendel" refer to the 6.5×39 mm cartridge or round. The 6 mm Advanced Rifle Cartridge or "6 mm ARC" refers to the 6.0×38 mm cartridge or round.

The terms "5.56" and "5.56 round" refer to the 5.56×45 mm NATO (military designation) cartridge or round. Likewise, the terms "0.223" and "0.223 round" refer to the 0.223 Remington cartridge or round. As understood by the skilled artisan, although not identical the 0.223 round is often referred to as a "5.56 round" and vice versa.

The terms "M855" and "M855 round" refer to a 5.56 round comprising a gilding, metal-jacketed, lead alloy core bullet with a steel penetrator. The term "MK 262" refers to a 5.56 round available from Black Hills Ammunition, Rapid City, S. Dak., U.S.A. The term "M193" refers to a 5.56 center-fire cartridge with a 55-grain, gilded metal-jacketed, lead alloy core bullet. The skilled artisan understands that the 0.223 round is used in a variety of rifles including, but not necessarily limited to AR-15 ("AR") type rifle platforms. Exemplary AR variants include the M16 rifle ("M16") and the M4 Carbine ("M4"), which is a variant of the M16. The term "M27" refers to the M27 Infantry Automatic Rifle, which is a magazine-fed 5.56 mm firearm based off of the HK416 rifle produced by Heckler & Koch GmbH, Oberndorf, Germany. The Browning .50 caliber or "50 Browning" refers to the 12.7×99 mm NATO round or cartridge (hereafter, the 12.7×99 mm).

Herein, the term "cartridge" refers to a projectile packaging for a firearm including at least a bullet, a casing, an explosive propellant and primer. The terms "cartridge" and "round" may be used interchangeably. The term "ammunition" refers to one or more cartridges. For purposes of this disclosure, the terms "ammunition" and "ammo" may be used interchangeably. Herein, a combination of a particular cartridge and firearm chambered for the cartridge may be referred to as a "firearm/ammo combination."

It has been discovered that for particular firearm/ammo combinations zeroed at one or more particular distances the bullet drop in angular measurement (or "angular measure") is substantially or functionally the same for the one or more firearm/ammo combinations at one or more incremental distances from a target. The present disclosure provides a firearm optical sight reticle operationally configured to accommodate this commonality amongst firearm/ammo combinations, the firearm optical sight reticle comprising graduated marks graduated in angular measurement for use with the one or more firearm/ammo combinations (1) as aiming marks for exact firing using ballistic data, and (2) as target auto ranging marks, bullet drop compensation marks and moving target lead marks at the one or more incremental distances for rapid time on target aiming of stationary targets and/or moving targets according to incremental subtension values of angular measurement. Herein, "exact firing" refers to precise or accurate aiming and firing at a target a given distance from the optical sight, which is typically accomplished using ballistic data. Although the one or more incremental distances may vary depending on the firearm/ammo combination used, exemplary incremental distances of this disclosure include 300.0 yards, 400.0 yards, 500.0 yards and 600.0 yards in one embodiment of the firearm optical sight reticle and 300.0 meters, 400.0 meters, 500.0 meters and 600.0 meters in another embodiment of the firearm optical sight reticle according to the cartridges and corresponding firearms described herein.

In one embodiment, a reticle of this disclosure may be graduated in milliradians (hereafter referred to as a "MRAD reticle," "MIL reticle" or "MIL system reticle"). In another embodiment, a reticle of this disclosure may be graduated in MOA (hereafter referred to as a "MOA reticle"). In one embodiment, by zeroing particular firearm/ammo combinations at a given distance, a MRAD reticle of this disclosure may be operationally configured as a horizontal target auto ranging bullet drop compensation reticle out to a distance of or about 600.0 yards according to the first four (4.0) whole MRAD subtensions of the firearm reticle, e.g., 1.0 MRAD subtension, 2.0 MRAD subtension, 3.0 MRAD subtension, and 4.0 MRAD subtension, for stationary targets and/or moving targets while maintaining MRAD adjustments for exact firing at one or more targets. In another embodiment, a MRAD reticle of this disclosure may be operationally configured as a horizontal target auto ranging bullet drop compensation reticle out to a distance of or about 600.0 meters according to the first four (4.0) whole MRAD subtensions of the firearm reticle, e.g., 1.0 MRAD subtension, 2.0 MRAD subtension, 3.0 MRAD subtension, and 4.0 MRAD subtension, for stationary targets and/or moving targets while maintaining MRAD adjustments for exact firing at one or more targets. In another embodiment, a reticle of this disclosure, including a MRAD reticle, may further be operationally configured as a moving target auto lead reticle. In another embodiment, a reticle of this disclosure, including a MRAD reticle, may include one or more marks operationally configured as one or more moving target auto ranging marks, one or more moving target lead marks (or "moving target auto lead marks") and one or more moving target auto bullet drop compensation marks of the reticle.

In another embodiment, the present disclosure is directed to a firearm MRAD reticle that may be used as an auto ranging bullet drop compensation reticle wherein MRAD subtensions of the reticle act as auto ranging marks and bullet drop compensation marks out to a distance of or about 600.0 yards (or 600.0 meters). In one non-limiting embodiment, the MRAD reticle may include MRAD subtension marks of incremental value out to at least 15.0 MRADs (see FIG. 18) for exact firing operations using ballistic data. In another embodiment, a MRAD reticle of this disclosure may include MRAD subtension marks of incremental value beyond 15.0 MRADs for exact firing operations using ballistic data.

In another embodiment, the disclosure is directed to a MRAD reticle for use by a plurality of firearm/ammo combinations zeroed in a manner effective to use the MRAD reticle for exact firing operations using ballistic data and for horizontal auto ranging, moving target auto ranging, moving target auto leading and moving target auto bullet drop compensation out to a distance of 600.0 yards (or 600.0 meters). In another embodiment, depending on the firearm/ammo combination a MRAD reticle of this disclosure may be operationally configured as a firing solution using ballistic data and for horizontal auto ranging, moving target auto ranging, moving target auto leading and moving target auto bullet drop compensation out to a distance greater than 600.0 yards (or 600.0 meters).

In another embodiment, the disclosure is directed to a MRAD reticle for firearms operationally configured as a rapid horizontal range finder, moving target range finder, and bullet drop compensator at distances out to or about 600.0 yards according to the first four (4) MRAD subtensions of the reticle when zeroed according to the first four (4) MRAD subtensions and as an exact firing solution via MRAD integration of a plurality of aiming marks at a desired distance for a particular firearm.

In another embodiment, the disclosure is directed to a MRAD reticle operationally configured for rapid time on target out to distances of or about 600.0 yards. In another embodiment, a firearm reticle of this disclosure is operationally configured for rapid time on target out to distances of or about 500.0 meters or 600.0 meters depending on the firearm/ammo combination.

In another embodiment, the disclosure is directed to a MRAD reticle for firearms wherein one or more persons may use the same or dissimilar firearm/ammo combinations that are zeroed at a distance for accurate use with the MRAD reticle and successfully aim and fire upon a common target without having to make any ranging and/or bullet drop compensation calculations out to a target distance of or about 600.0 yards (or 600.0 meters). As such, a firearm reticle of this disclosure is versatile in that the MRAD reticle is compatible for use with a plurality of firearm/ammo combinations including one or more firearms of varying barrel lengths and/or cartridges and provides accurate horizontal auto ranging, moving target auto ranging and bullet drop compensation of a target out to a distance of or about 600.0 yards (or 600.0 meters) for a plurality of firearm/ammo combinations zeroed at one or more distances.

In another embodiment, the disclosure is directed to a MRAD reticle for use with different firearms and/or different cartridges set at zero distances according to the first four (4) whole MRAD subtensions of the MRAD reticle out to a distance of or about 500.0 meters or 600.0 meters depending on the firearm/ammo combination using the MRAD reticle. The first four (4) whole MRAD subtensions of the reticle may act as horizontal auto ranging bullet drop compensation marks while maintaining the MRAD functionality of the reticle for exact firing at one or more distances using ballistic data.

In another embodiment, the disclosure is directed to a MRAD reticle operationally configured for horizontal auto ranging, moving target auto ranging, bullet drop compensation and rapid time on target out to a distance of 600.0 yards (or 600.0 meters) depending on the configuration of the indicia of the firearm reticle and the size of the reticle on an optical scope.

In another embodiment, the disclosure is directed to an optical aiming device, for example, a MRAD reticle for a riflescope that optimizes or otherwise promotes rapid target acquisition. The MRAD reticle is operationally configured for aiming at stationary targets and/or moving targets out to a distance of or about 600.0 yards in one embodiment and a distance of or about 600.0 meters in another embodiment of the MRAD reticle. By zeroing a firearm/ammo combination at a particular distance usable with MRAD subtensions of the MRAD reticle, the MRAD reticle may operate as an auto ranging bullet drop compensation reticle out to a distance of or about 600.0 yards in one embodiment and a distance of or about 600.0 meters in another embodiment of the MRAD reticle.

In another embodiment, the disclosure is directed to a reticle that may be used in one or more optical sights and may be used with one or more of a variety of projectile weapons such as crossbows and firearms including but not necessarily limited to rifles, pistols, and other guns for ranging and aiming of one or more targets. In one embodiment, a reticle of this disclosure is located on a transparent member of an optical sight, such as a transparent plastic, crystal, fused silica, or glass. In one embodiment, a reticle of this disclosure may be etched onto a transparent member, e.g., etched onto glass via laser etching. In another embodiment, a reticle of this disclosure may be provided as a wire reticle as the term is understood by persons skilled in the art of reticles.

In another embodiment, the present disclosure is directed to an optical sight comprising a MRAD reticle with subtensions that measure MRAD effective as an exact firing solution according to prior calculations and/or data provided via ballistic calculations, e.g., via a ballistic calculator or ballistic calculator app for a computer and/or smartphone, wherein the MRAD reticle is operationally configured to correlate horizontal ranging and moving target ranging with bullet drop compensation out to a desired distance, e.g., a distance of 600.0 yards, according to the first four (4) MRAD subtensions of the MRAD reticle. A MRAD reticle of this disclosure may be particularly advantageous in military and/or law enforcement combat type scenarios including, but not necessarily limited to close-quarters combat and designated marksman roles.

In another embodiment, the present disclosure is directed to a firearm reticle for an optical sight graduated in angular measurement for use with one or more firearm/ammo combinations zeroed at one or more distances, the firearm reticle comprising (1) a point of origin aiming mark at an optical center of the optical sight; (2) subtension marks of incremental value; (3) bullet drop compensation at incremental distances correlated with the subtension marks; (4) horizontal target auto ranging correlated with the bullet drop compensation at the incremental distances; and (5) moving target auto ranging correlated with the bullet drop compensation at the incremental distances; wherein the firearm reticle is operationally configured for exact firing at one or more distances using ballistic data.

In another embodiment, the present disclosure is directed to a firearm reticle for use with one or more firearm/ammo combinations zeroed at one or more distances, comprising (1) a point of origin aiming mark; and (2) a first target auto ranging mark for horizontally auto ranging a target at a distance of 300.0 yards, a second target auto ranging mark for horizontally auto ranging a target at a distance of 400.0 yards, a third target auto ranging mark for horizontally auto ranging a target at a distance of 500.0 yards, a fourth target auto ranging mark for horizontally auto ranging a target at a distance of 600.0 yards, and one or more moving target auto ranging marks for auto ranging a target at one or more predetermined distances; wherein the first target auto ranging mark, the second target auto ranging mark, the third target auto ranging mark, and the fourth target auto ranging mark are subtension marks; wherein the one or more moving target auto ranging marks subtend from the point of origin aiming mark in incremental values; and wherein the first auto ranging mark is operationally configured as bullet drop compensation mark at a distance of 300.0 yards, the second auto ranging mark is operationally configured as bullet drop compensation mark at a distance of 400.0 yards, the third auto ranging mark is operationally configured as bullet drop compensation mark at a distance of 500.0 yards, and the fourth auto ranging mark is operationally configured as bullet drop compensation mark at a distance of 600.0 yards.

In another embodiment, the present disclosure is directed to a firearm reticle for an optical sight for use with one or more firearm/ammo combinations zeroed at one or more distances, comprising (1) a primary horizontal crosshair; (2) a primary vertical crosshair intersecting the primary horizontal crosshair defining a point of origin aiming mark of the firearm reticle; (3) a first secondary horizontal crosshair operationally configured as a 1.0 MRAD subtension mark and operationally configured as a bullet drop compensation mark and as a horizontal ranging mark of a target at a distance of 300.0 yards; (4) a second secondary horizontal crosshair operationally configured as a 2.0 MRAD subtension mark and operationally configured as a bullet drop compensation mark and as a horizontal ranging mark of a target at a distance of 400.0 yards; (5) a third secondary horizontal crosshair operationally configured as a 3.0 MRAD subtension mark and operationally configured as a bullet drop compensation mark and as a horizontal ranging mark of a target at a distance of 500.0 yards; (6) a fourth secondary horizontal crosshair operationally configured as a 4.0 MRAD subtension mark and operationally configured as a bullet drop compensation mark and as a horizontal ranging mark of a target at a distance of 600.0 yards; (7) a first moving target auto ranging mark subtending 1.0 MRAD operationally configured to auto range a moving target at a distance of 300.0 yards; (8) a second moving target auto ranging mark subtending 2.0 MRAD operationally configured to auto range a moving target at a distance of 400.0 yards; (9) a third moving target auto ranging mark subtending 3.0 MRAD operationally configured to auto range a moving target at a distance of 500.0 yards; (10) a fourth moving target auto ranging mark subtending 4.0 MRAD operationally configured to auto range a moving target at a distance of 600.0 yards; and (11) MRAD aiming marks correlated with the first secondary horizontal crosshair, the second secondary horizontal crosshair, the third secondary horizontal crosshair and the fourth secondary horizontal crosshair.

In another embodiment, the disclosure is directed to a MRAD reticle for a firearm operationally configured so that the trajectory of various cartridges may be aligned with the reticle at one or more zero distances in a manner effective to use the MRAD reticle for exact firing using ballistic data, e.g., ballistic data provided via a ballistic calculator or ballistic calculator app for a computer and/or smartphone (herein collectively referred to as a "ballistic calculator") and for horizontal auto ranging, moving target auto ranging and bullet drop compensation out to distances of or about 600.0 yards (or 600.0 meters). The MRAD reticle may also include moving target lead marks for targets traveling at one or more predetermined speeds.

A first non-limiting embodiment of a reticle 10 of this disclosure is provided in FIG. 1, which depicts the reticle 10 etched onto glass 95 of an optical sight 90 and graduated in angular measurement. As described below, suitable operation of the reticle 10 is determined by the configuration of the reticle 10 and the size of the reticle 10 in relation to the glass 95 of the optical sight 90. As understood by the skilled artisan, the size of the reticle 10 in relation to the glass 95 is determined according to the focal length of the optical sight 90. As explained herein, a reticle 10 of this disclosure may be graduated in MRAD or MOA. In an embodiment graduated in MRAD, a reticle 10 as shown in FIG. 1 suitably comprises one or more indicia operationally configured to at least correlate horizontal auto ranging with bullet drop compensation to provide rapid time on target aiming out to a maximum distance of 600.0 yards (or 600.0 meters where desired) according to the first four (4) MRADs of the reticle 10 using one or more firearm/ammo combinations zeroed at one or more distances. In another embodiment as described below, a reticle 10 of this disclosure may also include one or more indicia operationally configured to correlate moving target auto ranging with bullet drop compensation to provide rapid time on target aiming out to a maximum distance of 600.0 yards (or 600.0 meters where desired) according to the first four (4) MRADs of the reticle 10 using one or more firearm/ammo combinations zeroed at one or more distances.

As described herein, a reticle 10 of this disclosure includes at least (1) a first measurement mark comprising one or more indicia, (2) a second measurement mark comprising one or more indicia wherein at least part of the second measurement mark is located below the first measurement mark, and (3) one or more third measurement marks comprised of one or more indicia located below the first measurement mark, the one or more third measurement marks being operable with both the first measurement mark and the second measurement mark. A reticle 10 of this disclosure may also include one or more fourth measurement marks and/or one or more fifth measurement marks comprised of one or more indicia operable with the first measurement mark, the second measurement mark and the third measurement mark.

At a minimum, a first measurement mark comprises one or more indicia operationally configured as a point of origin of the reticle 10 at an optical center of an optical sight 90 and as a first horizontal ranging mark of the reticle 10 for auto ranging a target 99 at a predetermined distance. At a minimum, a second measurement mark comprises one or more indicia operationally configured as a vertical hairline or vertical crosshair of the reticle 10. At a minimum, the one or more third measurement marks comprise one or more indicia operationally configured as horizontal ranging marks including, but not necessarily limited to horizontal hairlines or crosshairs operable with the second measurement mark to provide one or more aiming marks. At a minimum, the one or more fourth measurement marks comprise one or more indicia operationally configured as subtensions in the reticle 10 as bullet drop compensation marks and/or wind adjustment marks and/or target auto ranging marks and/or angular measurement marks for exact firing using ballistic data.

With reference to the reticle 10 of FIG. 1, a centrally located first measurement mark comprises a single indicia or central aiming mark 15 in the form of a chevron with an uppermost edge 18 (or "upper tip 18") located at the optical center of the optical sight 90, a lower tip 19 or joint, and two legs defining a base 16 of the central aiming mark 15. In this embodiment of the reticle 10, the upper tip 18 defines a point of origin or point of origin aiming mark of the reticle 10 and the outer width of the base 16 of the central aiming mark 15 defines a first horizontal ranging mark of the reticle 10 for auto ranging a target 99 including, but not necessarily limited to an enemy combatant 99 at a predetermined distance. The second measurement mark is provided as a vertical crosshair type indicia in the form of a central vertical line or post referred to herein as a "central vertical crosshair 20" and the one or more third measurement marks are provided as horizontal hairline or horizontal crosshair type indicia 30, 32 and 34 bisected by the central vertical crosshair 20.

In another embodiment, a centrally located first measurement mark may be provided as a single indicia central aiming mark 15 in a shape other than a chevron. For example, a central aiming mark 15 may be provided as a single indicia in an "X" shape as shown in FIG. 2 wherein the center of the central aiming mark 15 defines a point of origin of the reticle 10 at an optical center of the optical sight 90 and the outer width of the base 16 of the central aiming mark 15 defines a first horizontal ranging mark of the reticle 10 for auto ranging a target such as an enemy combatant 99 at a predetermined distance.

In another embodiment, a centrally located first measurement mark may be provided as a single indicia central aiming mark 15 in one or more other forms including, but not necessarily limited to an inverted chevron, a closed circle, an open circle, a half circle, an arc, a "T" shape, an inverted "T" shape, a solid dot, a bullseye, a rectangle, a triangle, a "+" shape. In another embodiment, a centrally located first measurement mark may be provided as a combination of two or more individual indicia described above operationally configured to define a point of origin of the reticle 10 at an optical center of the optical sight 90 and a first horizontal ranging mark of the reticle 10 for auto ranging a target such as an enemy combatant 99 at a predetermined distance.

Still referring to FIG. 1, the central aiming mark 15, the central vertical crosshair 20 and the horizontal crosshairs 30, 32, 34 of this embodiment may be provided as solid members illuminated or otherwise displayed as a particular color or colors. In addition, the central vertical crosshair 20 and the horizontal crosshairs 30, 32, 34 may be provided as a solid member illuminated or otherwise displayed as a particular color or colors the same or different than the color or colors of the central aiming mark 15. In another embodiment, a central vertical crosshair 20 may intersect the central aiming mark 15 or extend downward from a central aiming mark 15 as a single indicia.

Figure 2:
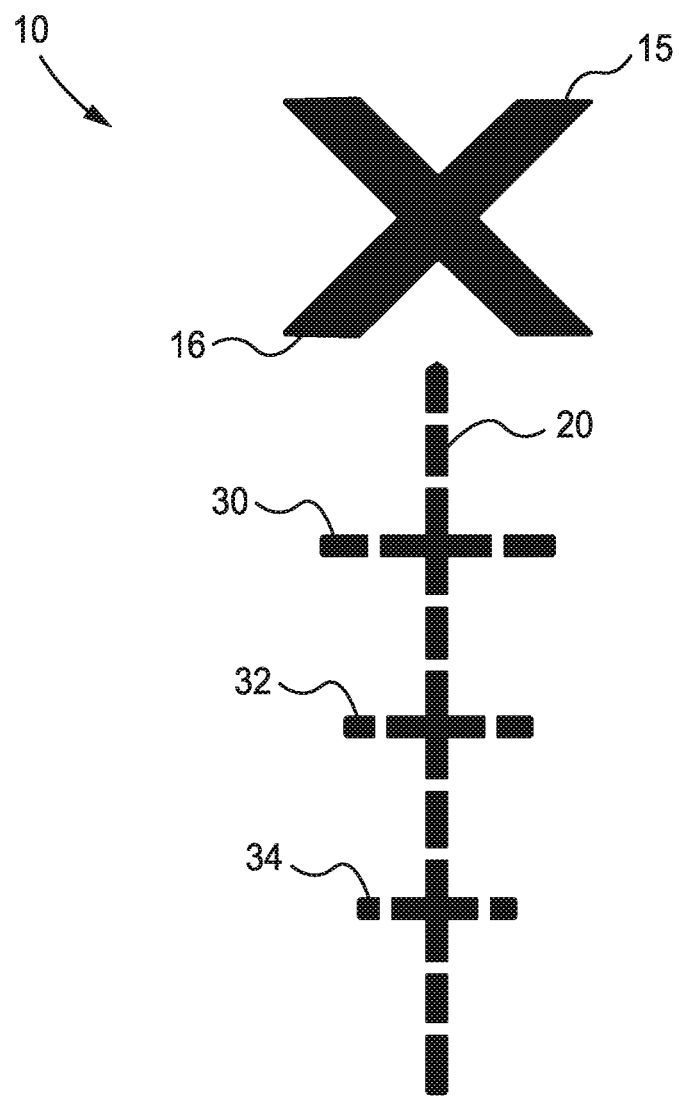
FIG. 2 is front view of another embodiment of a reticle of the present disclosure.

In another non-limiting embodiment, the central aiming mark 15, the central vertical crosshair 20 and/or the horizontal crosshairs 30, 32, 34 may comprise separate or individual marks and/or segmented lines as shown in FIG. 2. For example, the central vertical crosshair 20 may include one or more vertical lines of one or more desired lengths and/or one or more dots of one or more sizes spaced apart as desired. Other shapes or forms are also contemplated for forming the central aiming mark 15 and/or the central vertical crosshair 20 and the horizontal crosshairs 30, 32, 34 of the reticle 10, e.g., circles, crosses, horizontal hash marks. As described below, in another embodiment the reticle 10 may further include one or more additional MRAD subtension marks and/or one or more wind adjustment marks, one or more moving target lead marks operationally configured as aiming marks and one or more side scales operationally configured as vertical and/or horizontal ranging marks.

In another embodiment as described below, a centrally located first measurement mark may include two or more indicia operationally configured to provide a point of origin of the reticle 10 at an optical center of an optical sight 90 and operationally configured to provide a first horizontal ranging mark of the reticle 10 for auto ranging a target 99 at a predetermined distance.

Figure 3:
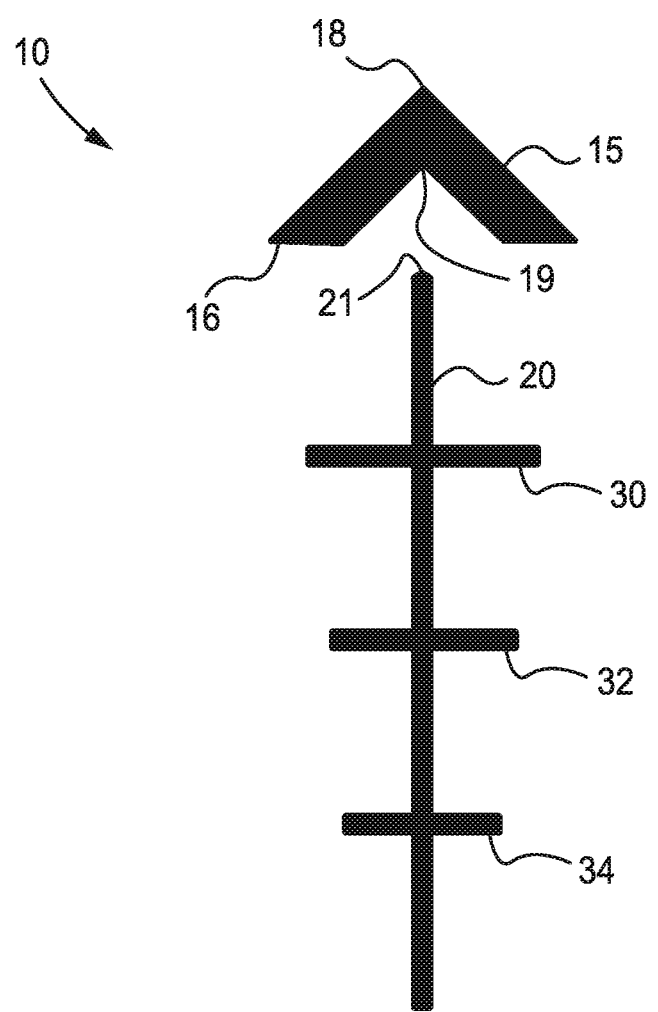
FIG. 3 is another front view of the reticle of FIG. 1.
Figure 4:
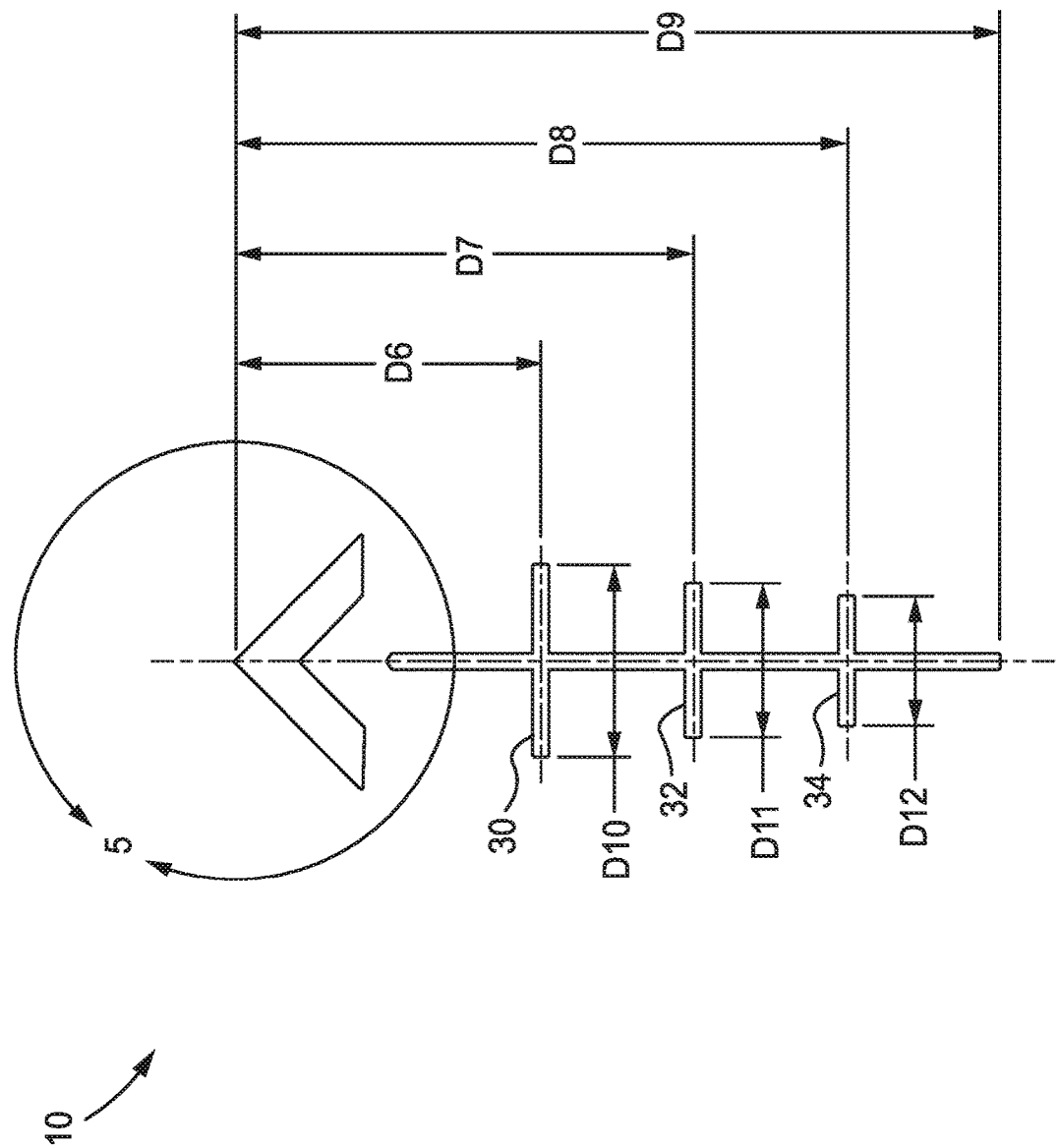
FIG. 4 is another front view of the reticle of FIG. 3.
Figure 5:
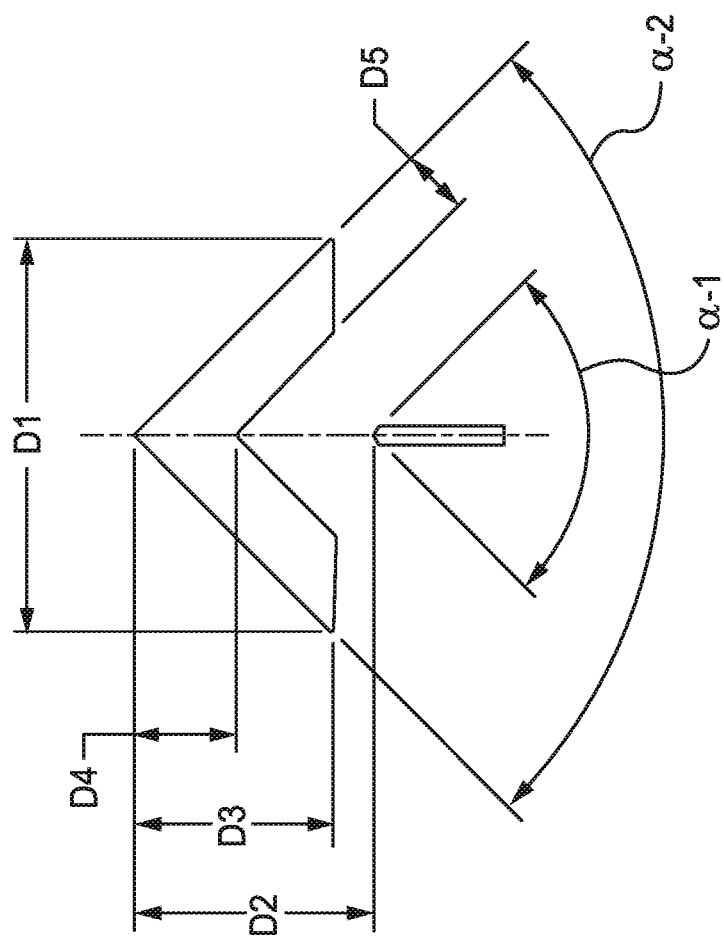
FIG. 5 is a detailed view of part of the reticle of FIG. 4.

For explanation of operation of the reticle 10 of FIG. 1 and various features integrated into the reticle 10, reference is made to FIGS. 3-5, which depict the reticle 10 of FIG. 1 as a MRAD reticle. In this embodiment, operation of the reticle 10 is realized according to the orientation of the reticle 10 indicia including the MRAD subtensions of the reticle 10 and the size of the etching of the reticle 10 on the glass 95 of the optical sight 90 according to the focal length of the optical sight 90. MRAD measurements and angular measurements for the reticle 10 depicted in FIGS. 3-5 are provided in Table 5.

TABLE 5

|  | MRAD | MOA | Degrees |
| --- | --- | --- | --- |
| D1: | 1.67 | 5.730 |  |
| D2: | 1.0 | 3.438 |  |
| D3: | 0.83 | 2.865 |  |
| D4: | 0.39 | 1.375 |  |
| D5: | 0.28 | 0.972 |  |
| D6: | 2.0 | 6.876 |  |
| D7: | 3.0 | 10.314 |  |
| D8: | 4.0 | 13.752 |  |
| D9: | 5.0 | 17.190 |  |
| D10: | 1.25 | 4.298 |  |
| D11: | 1.0 | 3.438 |  |
| D12: | 0.83 | 2.866 |  |
| α-1: |  |  | 90.0 |
| α-2: |  |  | 90.0 |

With further reference to FIGS. 3-5, the upper tip 18 of the central aiming mark 15 is operationally configured as a point of origin of the reticle 10 or point of origin aiming mark or zero range target aiming mark of the reticle 10. The lower tip 19 or joint of the central aiming mark 15 is operationally configured as a MRAD subtension mark (0.5 MRAD mark). In one or more embodiments, the lower tip 19 may also be used as a bullet drop compensation mark, e.g., at a distance of 200.0 yards depending on the firearm/ammo combination used. In this embodiment, the outer width of the base 16 of the central aiming mark 15 is operationally configured as a first horizontal ranging mark of the reticle 10 for auto ranging an enemy combatant 99 at a distance of or about 300.0 yards. In this embodiment, the outer width of the base 16 of the central aiming mark 15 is 1.67 MRADs, which corresponds to a center mass of 45.7 cm (18.0 inches) of an enemy combatant 99 at 300.0 yards. In another embodiment of the reticle 10, the base 16 may be used as a bullet drop compensation mark by reducing the angle α-2 to less than 90.0 degrees.

As shown in FIG. 3, the central vertical crosshair 20 comprises an uppermost edge 21 operationally configured as an aiming mark, as a MRAD subtension mark (1.0 MRAD mark) and as a bullet drop compensation mark at a distance of or about 300.0 yards for one or more firearm/ammo combinations as described herein. In one embodiment, the uppermost edge 21 may be located at a position even with the base 16 of the central aiming mark 15. As shown in FIG. 3, to assist in preventing the base 16 of the central aiming mark 15 from visually obscuring a target 99 when using the uppermost edge 21 as an aiming point at a distance of or about 300.0 yards, the uppermost edge 21 may be located at a point spaced apart below the base 16 of the central aiming mark 15 effective to produce hits on target. In this embodiment, the central vertical crosshair 20 is centrally aligned with the central aiming mark 15 wherein the uppermost edge 21 of the central vertical crosshair 20 is linearly aligned with the upper tip 18 and the lower tip 19 of the central aiming mark 15, i.e., the uppermost edge 21 is centrally aligned with the point of origin of the reticle 10.

With particular reference to FIG. 4, the first horizontal crosshair 30 is operationally configured as a MRAD subtension mark (2.0 MRAD mark) and as a MRAD holdover mark of the reticle 10. The first horizontal crosshair 30 is also operationally configured as a bullet drop compensation mark at a distance of 400.0 yards and operationally configured as a second horizontal ranging mark of the reticle 10 at a distance of 400.0 yards for one or more firearm/ammo combinations. In this embodiment, the width of the horizontal crosshair 30 is 1.25 MRADs, which corresponds to a center mass of 45.7 cm (18.0 inches) of an enemy combatant 99 at 400.0 yards. The second horizontal crosshair 32 is operationally configured as a MRAD subtension mark (3.0 MRAD mark) and as a MRAD holdover mark of the reticle 10. The second horizontal crosshair 32 is also operationally configured as a bullet drop compensation mark at a distance of 500.0 yards and operationally configured as a third horizontal ranging mark at a distance of 500.0 yards for one or more firearm/ammo combinations. In this embodiment, the width of the horizontal crosshair 32 is 1.0 MRAD, which corresponds to a center mass of 45.7 cm (18.0 inches) of an enemy combatant 99 at 500.0 yards. The third horizontal crosshair 34 is operationally configured as a MRAD subtension mark (4.0 MRAD mark) and as a MRAD holdover mark of the reticle 10. The third horizontal crosshair 34 is also operationally configured as a bullet drop compensation mark at a distance of 600.0 yards and operationally configured as a fourth horizontal ranging mark at a distance of 600.0 yards for one or more firearm/ammo combinations. In this embodiment, the width of the horizontal crosshair 34 is 0.83 MRAD, which corresponds to a center mass of 45.7 cm (18.0 inches) of an enemy combatant 99 at 600.0 yards. As such, the base 16 of the central aiming mark 15 and each of the horizontal crosshairs 30, 32, 34 are operationally configured as horizontal ranging marks of an enemy combatant 99 and other targets out to a distance of or about 600.0 yards according to the width of the base 16 of the central aiming mark 15 and the width of each of the horizontal crosshairs 30, 32, 34. In other words, a reticle 10 of this disclosure integrates at least horizontal ranging and bullet drop compensation according to the angular measurement of the reticle 10 to provide rapid target acquisition to shooters for more than one firearm/ammo combination that may be zeroed at different distances while also providing exact firing of an enemy combatant 99 using ballistic data, e.g., using a ballistic calculator or the like.

Exemplary horizontal ranging of an enemy combatant 99 using the reticle of FIGS. 3-5 is shown with reference to FIGS. 6-9. As stated above, the outer width of the base 16 of the central aiming mark 15 is operationally configured as a horizontal ranging mark of an enemy combatant 99 at a distance of or about 300.0 yards (see FIG. 6). Likewise, the horizontal crosshair 30 is operationally configured as a horizontal ranging mark of an enemy combatant 99 at a distance of or about 400.0 yards (see FIG. 7), the horizontal crosshair 32 is operationally configured as a horizontal ranging mark of an enemy combatant 99 at a distance of or about 500.0 yards (see FIG. 8), and the horizontal crosshair 34 is operationally configured as a horizontal ranging mark of an enemy combatant 99 at a distance of or about 600.0 yards (see FIG. 9). As FIGS. 6-9 illustrate, when an enemy combatant 99 is ranged horizontally at a distance of or about 300.0 yards, 400.0 yards, 500.0 yards and 600.0 yards, the enemy combatant 99 is also automatically aligned with a suitable aiming point of the reticle 10 effective to provide a suitable impact location of shot(s) fired at the enemy combatant 99, i.e., effective to produce shots within center mass of an enemy combatant 99. In particular, the uppermost edge 21 of the central vertical crosshair 20 provides an aiming point on center mass of an enemy combatant 99 ranged horizontally at a distance of or about 300.0 yards. The point of intersect 40 of the central vertical crosshair 20 and the horizontal crosshair 30 provide an aiming point on center mass of an enemy combatant 99 ranged horizontally at a distance of or about 400.0 yards. The point of intersect 42 of the central vertical crosshair 20 and the horizontal crosshair 32 provide an aiming point on center mass of an enemy combatant 99 ranged horizontally at a distance of or about 500.0 yards. The point of intersect 44 of the central vertical crosshair 20 and the horizontal crosshair 34 provide an aiming point on center mass of an enemy combatant 99 ranged horizontally at a distance of or about 600.0 yards.

With reference to FIG. 6, ranging of an enemy combatant 99 shoulder tip to shoulder tip at a distance of or about 300.0 yards is realized using the base 16 of the central aiming mark 15. As shown in FIG. 6, when an enemy combatant 99 is ranged at a distance of or about 300.0 yards the uppermost edge 21 of the central vertical crosshair 20 may be used as an aiming point or point of impact on an enemy combatant 99 for rounds fired at a distance of or about 300.0 yards. As further shown in FIG. 6, ranging of an enemy combatant 99 shoulder tip to shoulder tip via the base 16 of the central aiming mark 15 aligns or substantially aligns the uppermost edge 21 of the central vertical crosshair 20 at a desirable aiming point on center mass of an enemy combatant 99, e.g., mid-torso, without having to adjust the reticle 10 from its horizontal ranging position to aim and render a desired hit on target.

With reference to FIG. 7, when ranging an enemy combatant 99 shoulder tip to shoulder tip at a distance of or about 400.0 yards using horizontal crosshair 30, the point of intersect 40 between the central vertical crosshair 20 and horizontal crosshair 30 is operationally configured as an aiming point on center mass of an enemy combatant 99, e.g., mid-torso, without having to adjust the reticle 10 from its horizontal ranging position to aim and render a hit on target. Similarly, the point of intersect 42 between the central vertical crosshair 20 and horizontal crosshair 32 is operationally configured as an aiming point on center mass of an enemy combatant 99, e.g., mid-torso, ranged at 500.0 yards and the point of intersect 44 between the central vertical crosshair 20 and horizontal crosshair 34 is operationally configured as an aiming point on center mass of an enemy combatant 99 ranged at 600.0 yards. One or more other areas or parts of an enemy combatant 99 may be targeted as desired.

MRAD subtension marks of the reticle 10 of FIG. 3 are described with reference to FIG. 10. For example, the uppermost edge 21 of the central vertical crosshair 20 subtends one (1.0) MRAD from the upper tip 18 of the central aiming mark 15 (see D13). The horizontal crosshair 30 subtends two (2.0) MRADs from the upper tip 18 of the central aiming mark 15 (see D14). The horizontal crosshair 32 subtends three (3.0) MRADs from the upper tip 18 of the central aiming mark 15 (see D15) and the horizontal crosshair 34 subtends four (4.0) MRADs from the upper tip 18 of the central aiming mark 15 (see D16). As such, the uppermost edge 21 of the central vertical crosshair 20 and the horizontal crosshairs 30, 32, 34 are operationally configured as MRAD subtension marks for the first four (4.0) MRADs of the reticle 10 of FIG. 3.

In addition to correlating horizontal ranging with bullet drop compensation that is integrated into the MRAD system of the reticle 10, a reticle 10 of this disclosure also provides horizontal ranging and bullet drop compensation commonality for different cartridges zeroed at one or more distances for one or more firearm/ammo combinations effective to provide rapid real time target acquisition of target such as an enemy combatant 99 at distances out to or about 600.0 yards according to the first four (4.0) MRADs. In one non-limiting example, a reticle 10 of this disclosure may be used with one or more firearm/ammo combinations zeroed at one or more distances. Exemplary cartridges of the one or more firearm/ammo combinations may include, but are not necessarily limited to a 5.56×45 mm cartridge, a 0.223 cartridge, a 0.308 cartridge, and a 7.62×51 mm NATO cartridge.

In a military or other combative scenario where two or more persons are equipped with different firearm/ammo combinations, a reticle 10 of this disclosure is operationally configured to be incorporated into an optical sight of each firearm and provide horizontal ranging and bullet drop compensation for rapid or fast time on target out to a distance of or about 600.0 yards. In addition to possible cost savings, the familiarity of using a common reticle 10 of this disclosure with a plurality of firearm/ammo combinations, including NATO firearm/ammo combinations, amongst groups of persons, e.g., persons in a squadron, team, crew, or other group, enables such persons to (1) switch between different types of firearm/ammo combinations without having to learn to operate multiple types of reticles, and to (2) communicate target ranging information to one another in real time regardless the different firearm/ammo combination in use by any one person of a group and regardless the distance at which each of the firearm/ammo combinations is zeroed.

For purposes of describing use of the reticle 10 as shown and described in FIGS. 3-5 with different firearm/ammo combinations that may be zeroed at different distances effective for use with the reticle 10, reference is made to the non-limiting exemplary bullet trajectory information as provided in Tables 6-8. Table 6 provides bullet trajectory information for a M4 and M193 cartridge. The 5.56×45 mm M193 cartridge has a ballistic coefficient of 0.120 G7; a bullet weight of 55.0 grain; a muzzle velocity of 883.9 mps (2900.0 ft/s); and a zero range of 50.0 yards, i.e., zeroed at 50.0 yards. Table 7 provides bullet trajectory information for a M27 and M855 cartridge. The M855 cartridge has a ballistic coefficient of 0.158 G7; a bullet weight of 62.0 grain; a muzzle velocity of 908.3 mps (2980.0 fW/s); and a zero range of 100.0 yards, i.e., zeroed at 100.0 yards. Table 8 provides bullet trajectory information for a M16 and MK 262 cartridge. The 5.56×45 mm MK 262 cartridge has a ballistic coefficient of 0.362 Gi; a bullet weight of 77.0 grain; a muzzle velocity of 858.9 mps (2818.0 ft/s); and a zero range of 100.0 yards, i.e., zeroed at 100.0 yards.

TABLE 6

| Range (yards) | Bullet Drop (inches) | Bullet Drop (cm) | Bullet Drop (MRAD) |
| --- | --- | --- | --- |
| 0 | −2.50 | −6.35 | 0.00 |
| 100 | 1.33 | 3.38 | 0.37 |
| 200 | −0.24 | −0.61 | −0.03 |
| 300 | −8.95 | −22.73 | −0.84 |
| 400 | −27.30 | −69.34 | −1.93 |
| 500 | −59.04 | −149.96 | −3.34 |
| 600 | −109.93 | −279.22 | −5.18 |

TABLE 7

| Range (yards) | Bullet Drop (inches) | Bullet Drop (cm) | Bullet Drop (MRAD) |
| --- | --- | --- | --- |
| 0 | −2.50 | −6.35 | 0.00 |
| 100 | −0.01 | −0.03 | −0.00 |
| 200 | −2.28 | −5.79 | −0.32 |
| 300 | −10.41 | −26.44 | −0.98 |
| 400 | −25.80 | −65.53 | −1.82 |
| 500 | −50.30 | −127.76 | −2.85 |
| 600 | −86.40 | −219.46 | −4.07 |

TABLE 8

| Range (yards) | Bullet Drop (inches) | Bullet Drop (cm) | Bullet Drop (MRAD) |
| --- | --- | --- | --- |
| 0 | −2.50 | −6.35 | 0.00 |
| 100.0 | −0.00 | −0.00 | −0.00 |
| 200.0 | −2.81 | −7.14 | −0.40 |
| 300.0 | −12.08 | −30.68 | −1.14 |
| 400.0 | −29.29 | −74.4 | −2.07 |
| 500.0 | −56.36 | −143.15 | −3.19 |
| 600.0 | −95.76 | −243.23 | −4.52 |

As shown in Tables 6-8, the bullet drop in NURADs is substantially similar for each of the three exemplary firearm/ammo combinations at distances from or about 300.0 yards to or about 600.0 yards. For example, at a range of 300.0 yards, the bullet drop for the M4 and M193 cartridge is −0.84 NURAD; the bullet drop for the M27 and M855 cartridge is −0.98 NMRAD; and the bullet drop for the M16 and 162 cartridge is −1.14 NURADs. Said another way, the bullet drop for the M4 and M193 cartridge is within 0.16 NMRAD of a bullet drop of −1.00 MRAD at 300.0 yards. The bullet drop for the M27 and M855 cartridge is within 0.02 MRAD of a bullet drop of −1.00 NMRAD at 300.0 yards and the bullet drop for the M16 and MK 262 cartridge is within 0.14 NMRAD of a bullet drop of −1.00 NURAD at 300.0 yards. Accordingly, the variance in bullet drop from an even −1.00 NMRAD for each of the above described firearms and cartridges at 300.0 yards is nominal ("nominal variance") whereby the reticle 10 is effective for use to produce hits on a target, i.e., hits within center mass of a human enemy combatant 99 or similar size target, for each of the M4 and M193 cartridge, the M27 and M855 cartridge, and the M16 and MK 262 cartridge at 300.0 yards. As such, by zeroing a firearm/ammo combination according to the first four (4.0) whole MRAD subtensions of the reticle 10, e.g., zeroing at 100.0 yards for a particular firearm/ammo combination, zeroing at 50.0 yards for another particular firearm/ammo combination, or zeroing at a different distance, a reticle 10 as described in FIGS. 3-5 is operationally configured to use the first four (4.0) whole MRAD subtensions as bullet drop compensation marks for rapid or fast time on target at distances of or about at least 300.0 yards, 400.0 yards, 500.0 yards and 600.0 yards regardless the firearm/ammo combination and its zero range and still produce shots within center mass of an enemy combatant 99.

Herein, "nominal variance" suitably includes an allowable variance in bullet drop for hits within center mass of an enemy combatant 99 at distances out to or about 600.0 yards, or at distances out to or about 600.0 meters in another embodiment of the reticle 10. Because of this identified nominal variance in bullet drop for certain firearm/ammo combinations at particular zero ranges, and because of the angular measurement of the first four (4.0) whole MRAD subtensions, a reticle 10 of this disclosure is not only operationally configured to function as a bullet drop compensator out to or about 600.0 yards according to the first four (4.0) whole MRAD subtensions, but a reticle 10 of this disclosure also correlates horizontal auto ranging with the first four (4.0) whole MRAD subtensions of the reticle 10 to provide rapid targeting of an enemy combatant 99 at predetermined distances including distance of or about at least 300.0 yards, 400.0 yards, 500.0 yards and 600.0 yards.

Using a reticle as shown in FIG. 3, a user of a M4 and M193 cartridge may range an enemy combatant 99 at a distance of or about 300.0 yards using the base 16 of the central aiming mark 15 and target the enemy combatant 99 according to the uppermost edge 21 of the central vertical crosshair 20 as shown in FIG. 6 and still realize a critical hit within center mass of the enemy combatant 99 regardless of having a bullet drop of −0.84 MRAD at a zero range of 50.0 yards. Likewise, a user of a M27 and M855 cartridge aiming at the same enemy combatant 99 as the user of the M4 and M193 cartridge may also range the enemy combatant 99 at a distance of or about 300.0 yards using the base 16 of the central aiming mark 15 and target the enemy combatant 99 according to the uppermost edge 21 of the central vertical crosshair 20 as shown in FIG. 6 and still realize a critical hit within center mass of the enemy combatant 99 regardless of having a bullet drop of −0.98 MRAD at a zero range of 100.0 yards. In other words, at a distance of or about 300.0 yards the bullet drop in MRADs of the M4 and M193 cartridge and the M27 and M855 cartridge is close enough to a bullet drop of −1.00 MRAD to render a successful hit on a target such as an enemy combatant 99 according to the configuration of the reticle 10. Similar nominal variances for these exemplary firearms and cartridges can be found at distance of or about 400.0 yards, 500.0 yards and 600.0 yards according to horizontal crosshairs 30, 32 and 34, which equate to the 2.0 MRAD mark, the 3.0 MRAD mark and the 4.0 MRAD mark as described in reference to FIG. 10.

As understood by the skilled artisan, various cartridges may require zeroing at different distances according to the ambient conditions such as altitude and barometric pressure. As such, a particular cartridge may be used with a reticle 10 of this disclosure as intended when the firearm/ammo combination is zeroed at an operable range, but the same cartridge may not correlate for use with a reticle 10 of this disclosure if and when zeroed at a different or non-operable range. In other words, a particular cartridge may be used with a reticle 10 of this disclosure at sea level but not be desired for use with a reticle 10 of this disclosure at a particular elevation above sea level and/or at one or more particular barometric pressures. Other cartridges may be operable with a reticle 10 of this disclosure at varying elevations and/or barometric pressures. In one non-limiting example, a 0.308 cartridge may be used with a reticle 10 of this disclosure at both sea level and at an elevation of or about 1524.0 meters (5000.0 feet) by adjusting the zero. In particular, at sea level a 0.308 cartridge may be zeroed at a range of 50.0 yards for operable use with a reticle 10 as shown in FIG. 3. The same 0.308 cartridge fired at an altitude of 1524.0 meters (5000.0 feet) may be zeroed at a range of 100.0 yards for operable use with the reticle 10 as shown in FIG. 3. Bullet trajectory information for an exemplary 0.308 cartridge at sea level and at an elevation of 5000.0 feet is provided in Table 9.

TABLE 9

| Range (yards) | .308 Cartridge, 50.0 yard Zero Bullet Drop (MRAD) at Sea Level | .308 Cartridge, 100.0 yard Zero Bullet Drop (MRAD) at 5000.0 Feet Elevation |
|---|---|---|
| 300.0 | 1.1 | 0.9 |
| 400.0 | 2.0 | 1.9 |
| 500.0 | 3.0 | 3.0 |
| 600.0 | 4.2 | 4.4 |

Figure 11:
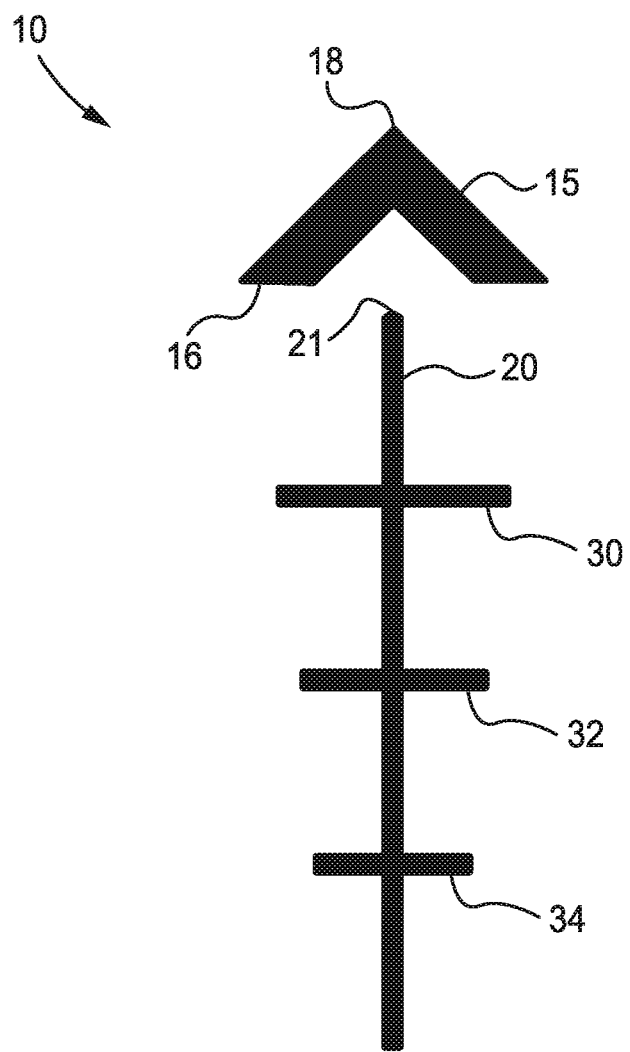
FIG. 11 is a front view of another embodiment of a reticle of the present disclosure.
Figure 12:
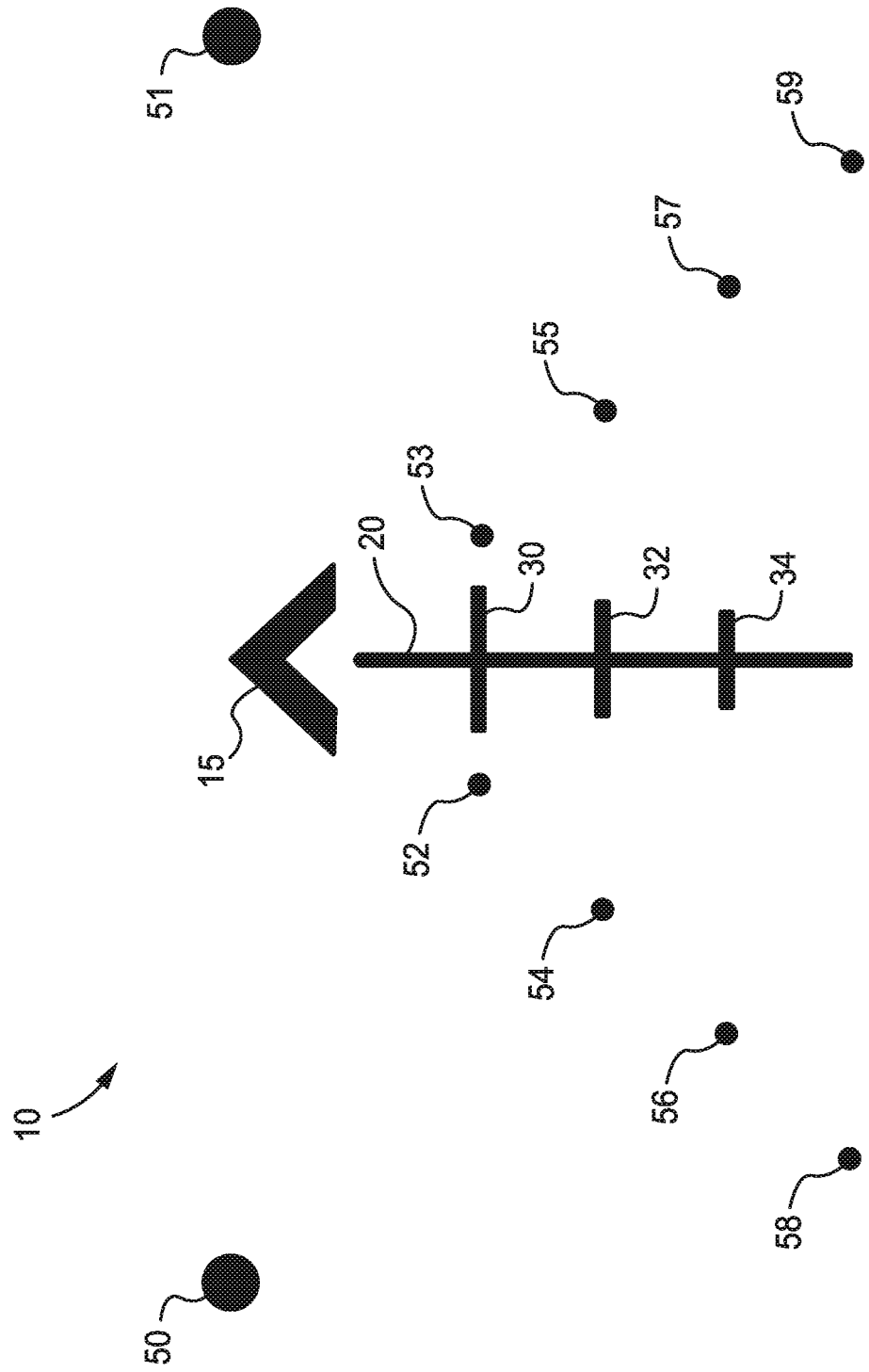
FIG. 12 is a front view of another embodiment of a reticle of the present disclosure.

Turning to FIG. 11, in another embodiment a MRAD reticle 10 of this disclosure may operate as a horizontal ranging and bullet drop compensation reticle for different firearm/ammo combinations at varying zeros out to a distance of or about 600.0 meters according to the first four (4) MRADs of the reticle 10 (or out to a distance of or about 600.0 yards in another embodiment). As shown in FIG. 12, a reticle as depicted in FIG. 11, and also as depicted in FIG. 3, may comprise one or more fourth measurement marks including indicia of one or more shapes and/or forms operationally configured as aiming points including, but not necessarily limited to bullet drop compensation marks, target auto ranging marks, wind adjustment marks, moving target lead marks, and combinations thereof. In the embodiment of FIG. 12, the one or more fourth measurement marks comprise wind adjustment dots 50-59 although one or more other shapes and/or forms of indicia may be employed as desired. The reticle 10 of FIG. 3 may also comprise one or more fourth measurement marks, e.g., wind adjustment dots 50-59, similar as shown in FIG. 12. As described below, a reticle 10 of this disclosure is operationally configured to integrate one or more moving target lead marks according to the angular measure of the reticle 10.

Figure 13:
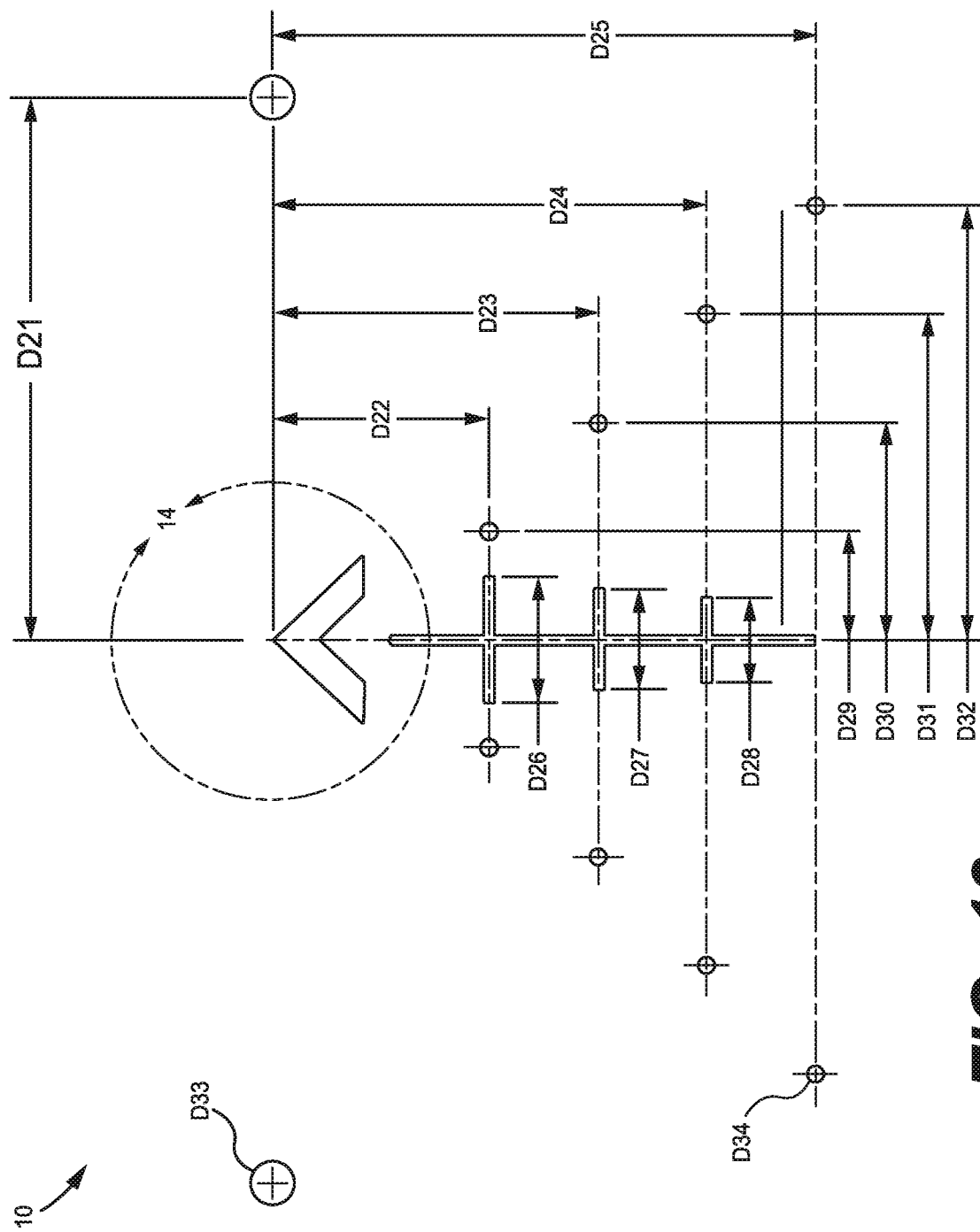
FIG. 13 is another front view of the reticle of FIG. 12.
Figure 14:
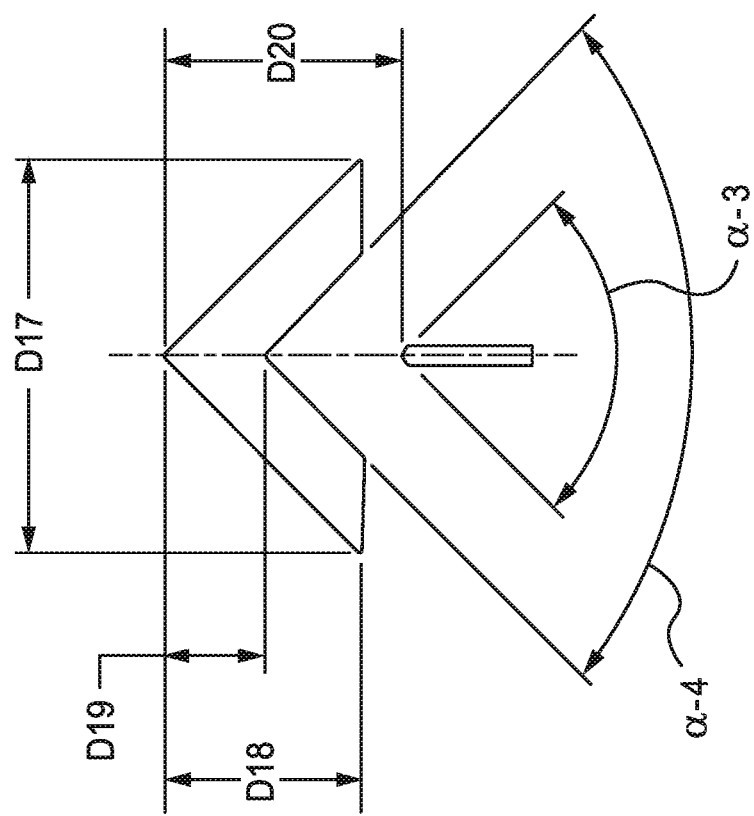
FIG. 14 is a detailed view of part of the reticle of FIG. 13.

With reference to FIGS. 13-14, a reticle 10 as shown in FIG. 12 for use as a horizontal ranging and bullet drop compensation reticle out to a distance of or about 600.0 meters includes MRAD measurements and angular measurements as listed in Table 10 below:

TABLE 10

| | MRAD | MOA | Degrees |
|---|---|---|---|
| D17: | 1.52 | 5.24 | |
| D18: | 0.83 | 2.865 | |
| D19: | 0.39 | 1.375 | |
| D20: | 1.0 | 3.438 | |
| D21: | 5.0 | 17.19 | |
| D22: | 2.0 | 6.876 | |
| D23: | 3.0 | 10.314 | |
| D24: | 4.0 | 13.752 | |
| D25: | 5.0 | 17.19 | |
| D26: | 1.14 | 3.93 | |
| D27: | 0.91 | 3.14 | |
| D28: | 0.76 | 2.62 | |
| D29: | 1.0 | 3.438 | |
| D30: | 2.0 | 6.876 | |

TABLE 10-continued

| | MRAD | MOA | Degrees |
|---|---|---|---|
| D31: | 3.0 | 10.314 | |
| D32: | 4.0 | 13.752 | |
| D33: | 0.39 | 1.375 | |
| D34: | 0.15 | 0.50 | |
| α-3: | | | 90.0 |
| α-4: | | | 84.88 |

In the embodiment of the reticle 10 of FIG. 12, the width of the chevron type central aiming mark 15 at its base 16 is 1.52 MRADs, which corresponds to a center mass of 45.7 cm (18.0 inches) at 300.0 meters. The width of horizontal crosshair 30 is 1.14 MRADs, which corresponds to a center mass of 45.7 cm (18.0 inches) at 400.0 meters. The width of horizontal crosshair 32 is 0.91 MRAD, which corresponds to a center mass of 45.7 cm (18.0 inches) at 500.0 meters. The width of horizontal crosshair 34 is 0.76 MRAD, which corresponds to a center mass of 45.7 cm (18.0 inches) at 600.0 meters.

Figure 15:
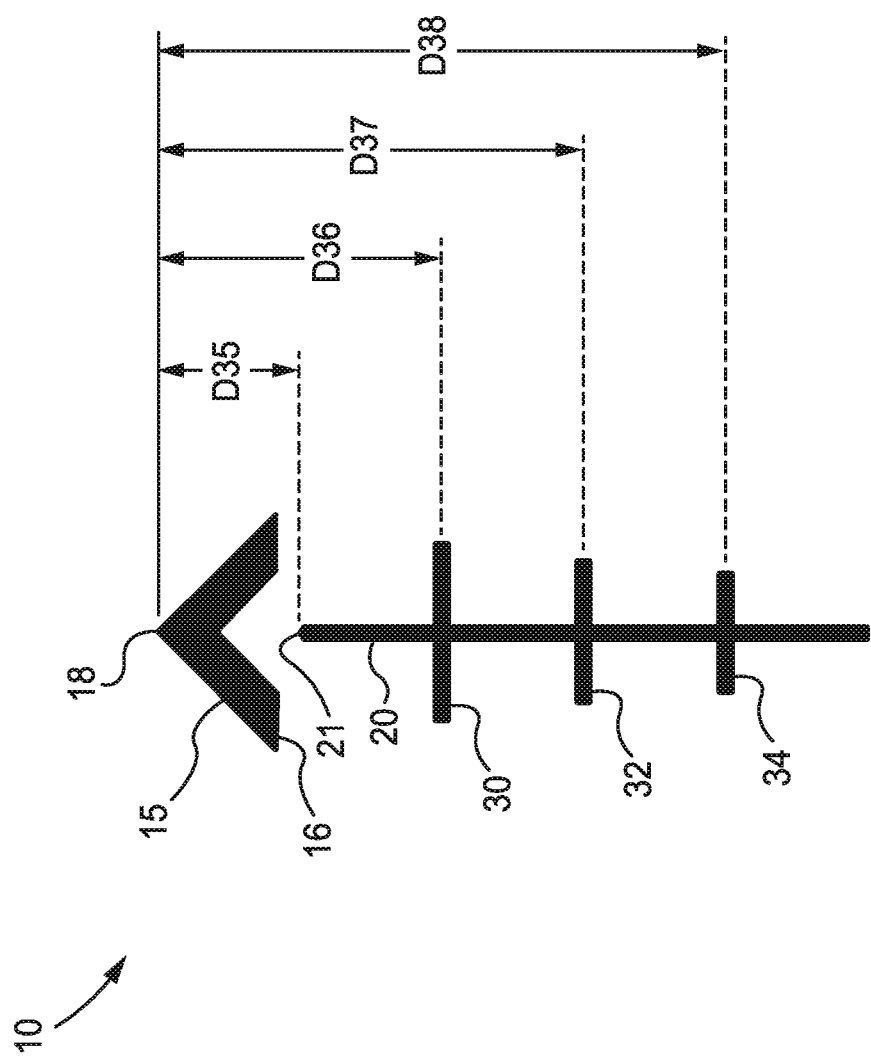
FIG. 15 is another front view of the reticle of FIG. 11.

Various subtensions of the reticle 10 of FIG. 11 are explained with reference to FIG. 15. For example, the uppermost edge 21 of the central vertical crosshair 20 subtends one (1.0) MRAD from the upper tip 18 of the central aiming mark 15 (see D35). The horizontal crosshair 30 subtends two (2.0) MRADs from the upper tip 18 of the central aiming mark 15 (see D36). The horizontal crosshair 32 subtends three (3.0) MRADs from the upper tip 18 of the central aiming mark 15 (see D37). The horizontal crosshair 34 subtends four (4.0) MRADs from the upper tip 18 of the central aiming mark 15 (see D38). As such, in this embodiment the uppermost edge 18 of the central aiming mark 15, the uppermost edge 21 of the central vertical crosshair 20 and the horizontal crosshairs 30, 32, 34 are operationally configured as marks (1) operationally configured to provide each of the first four (4.0) MRADs of the reticle 10, (2) operationally configured to provide bullet drop compensation using the first four (4.0) MRADs, and (3) operationally configured to provide target aiming points at distances out to or about 600.0 meters. In addition, the base 16 of the central aiming mark 15 and the horizontal crosshairs 30, 32 and 34 are operationally configured as horizontal target auto ranging marks of an enemy combatant 99 out to a distance of or about 600.0 meters, in a manner similar as described above in reference to FIGS. 6-9, for firearm/ammo combinations zeroed at one or more distances—including, but not necessarily limited to firearm/ammo combinations comprising a 5.56×45 mm cartridge, a 0.223 cartridge, a 0.308 cartridge, and a 7.62×51 mm NATO cartridge.

For purposes of describing use of the reticle 10 as shown and described in FIG. 11-15, with different firearm/ammo combinations that may be zeroed at different distances, reference is made to the non-limiting exemplary bullet trajectory information as provided in Tables 11-13. Table 11 provides bullet trajectory information for an AR-15 and M855 cartridge. The M855 cartridge of Table 11 has a ballistic coefficient of 0.158 G7; a bullet weight of 62.0 grain; a muzzle velocity of 908.0 mps (2980.0 ft/s); and a zero range of 100.0 meters, i.e., zeroed at 100.0 meters. Table 12 provides bullet trajectory information for an M16 and M855 cartridge. The M855 cartridge of Table 12 has a ballistic coefficient of 0.158 G7; a bullet weight of 62.0 grain; a muzzle velocity of 938.8 mps (3080.0 ft/s); and a zero range of 100.0 meters, i.e., zeroed at 100.0 meters. Table 13 provides bullet trajectory information for an M4 and M855 cartridge. The M855 cartridge of Table 13 has a ballistic coefficient of 0.158 G7; a bullet weight of 62.0 grain; a muzzle velocity of 877.8 mps (2880.0 ft/s); and a zero range of 200.0 meters, i.e., zeroed at 200.0 meters.

TABLE 11

| Range (yards) | Bullet Drop (inches) | Bullet Drop (cm) | Bullet Drop (MRAD) |
|---|---|---|---|
| 0 | −2.50 | −6.35 | 0.00 |
| 100 | −0.00 | −0.00 | −0.00 |
| 200 | −2.95 | −7.5 | −0.38 |
| 300 | −12.33 | −31.3 | −1.06 |
| 400 | −29.09 | −73.9 | −1.88 |
| 500 | −54.66 | −138.8 | −2.83 |
| 600 | −91.10 | −231.4 | −3.92 |

TABLE 12

| Range (yards) | Bullet Drop (inches) | Bullet Drop (cm) | Bullet Drop (MRAD) |
|---|---|---|---|
| 0 | −2.50 | −2.5 | 0.00 |
| 100 | 0.50 | 1.27 | 0.00 |
| 200 | −2.05 | −5.21 | −0.26 |
| 300 | −11.74 | −29.8 | −1.01 |
| 400 | −30.45 | −77.3 | −1.97 |
| 500 | −61.06 | −155.1 | −3.16 |
| 600 | −108.12 | −274.6 | −4.66 |

TABLE 13

| Range (yards) | Bullet Drop (inches) | Bullet Drop (cm) | Bullet Drop (MRAD) |
|---|---|---|---|
| 0 | −2.50 | −6.35 | −0.00 |
| 100 | 1.93 | 4.9 | 0.50 |
| 200 | −0.05 | −0.13 | 0.00 |
| 300 | −10.33 | −26.2 | −0.89 |
| 400 | −31.20 | −79.25 | −2.02 |
| 500 | −66.20 | −168.15 | −3.42 |
| 600 | −121.00 | −307.3 | −5.21 |

As shown in Tables 11-13, the bullet drop in MRADs is similar for each of the three exemplary firearm/ammo combinations at distances from or our about 300.0 meters to or about 600.0 meters. For example, at a range of or about 400.0 meters, the bullet drop for the AR-15 and M855 cartridge is −1.88 MRADs; the bullet drop for the M16 and M855 cartridge is −1.97 MRADs; and the bullet drop for the M4 and M855 cartridge is −2.02 NMRADs. Said another way, the bullet drop for the AR-15 and M855 cartridge is within 0.12 MRAD of a bullet drop of −2.00 NHUDs. The bullet drop for the M16 and M855 cartridge is within 0.03 NMRAD of a bullet drop of −2.00 MRADs and the bullet drop for the M4 and M855 cartridge is within 0.02 NMRAD of a bullet drop of −2.00 MRADs. Similar as described above, the variance from a bullet drop of an even −2.00 MELs for each of the firearms and cartridges at or about 400.0 meters described in Tables 11-13 is a nominal variance. As such, at distances of or about 300.0 meters, 400.0 meters, 500.0 meters and 600.0 meters, the bullet drop in NMRADs of the AR-15 and M855 cartridge, M16 and M855 cartridge and M4 and M855 cartridge are close enough to one (1.0) MRAD, two (2.0) MRADs, three (3.0) MRADs and four (4.0) MRADs to use the first four (4.0) whole MRAD subtensions of the reticle 10 as bullet drop compensation marks to produce shots within center mass of an enemy combatant 99 at distances of or about at least 300.0 meters, 400.0 meters, 500.0 meters and 600.0 meters.

For example, a user of a M16 and M855 cartridge zeroed at 100.0 meters may range and target an enemy combatant 99 at or about 400.0 meters using horizontal crosshair 30, i.e., the two (2.0) MRAD mark, similar as shown in FIG. 7, and still realize a critical hit within center mass of the enemy combatant 99 regardless of having a bullet drop of −1.97 MRADs. Likewise, a user of a M4 and M855 cartridge zeroed at 200.0 meters aiming at the same enemy combatant 99 as the user of the M16 and M855 cartridge may also range and target the enemy combatant 99 at or about 400.0 meters using the horizontal crosshair 30 and still realize a critical hit within center mass of the enemy combatant 99 regardless of having a bullet drop of −2.02 MRADs.

Figure 16:
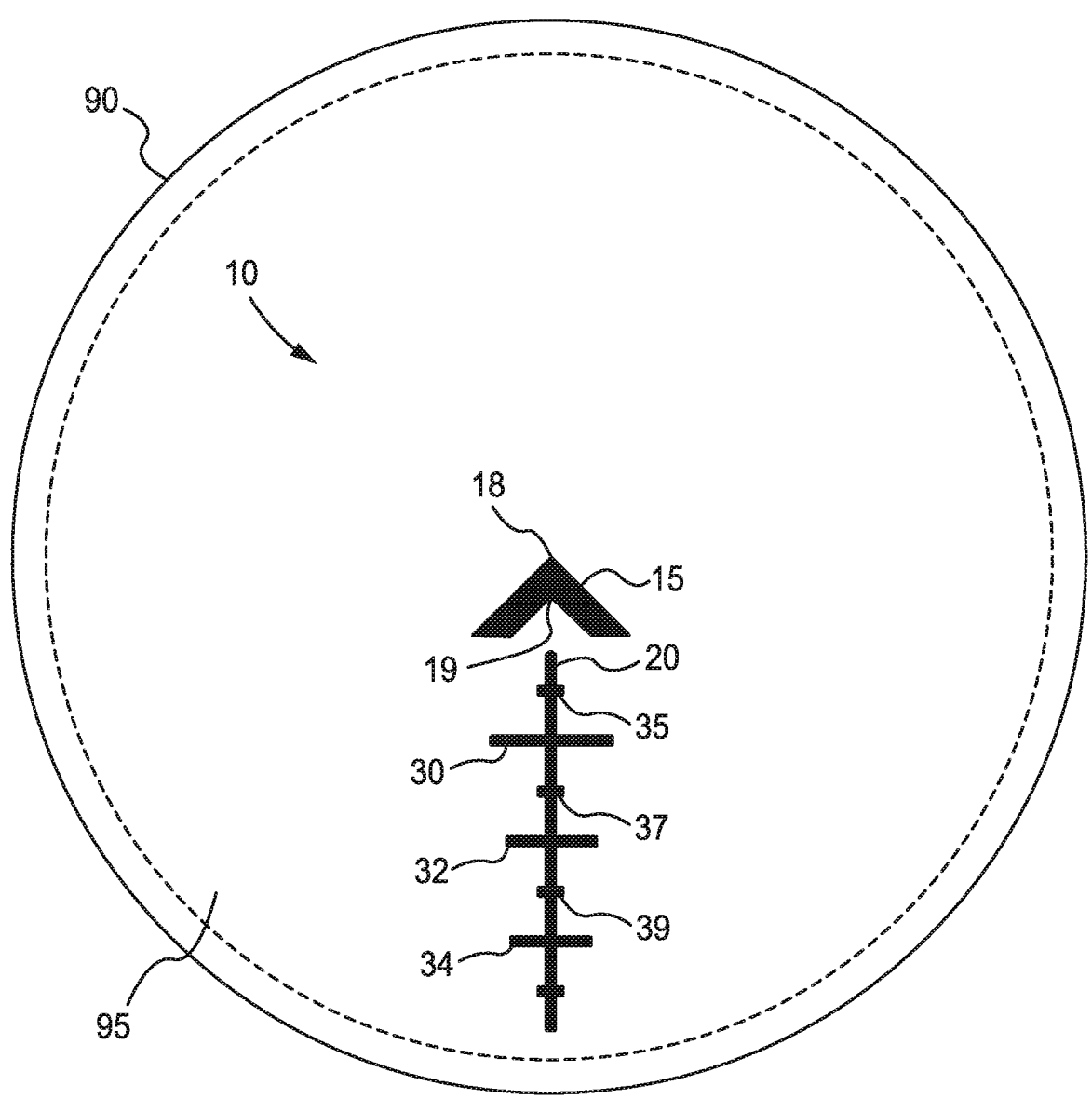
FIG. 16 is a front view of another embodiment of a reticle of the present disclosure on a transparent member of an optical sight.
Figure 17:
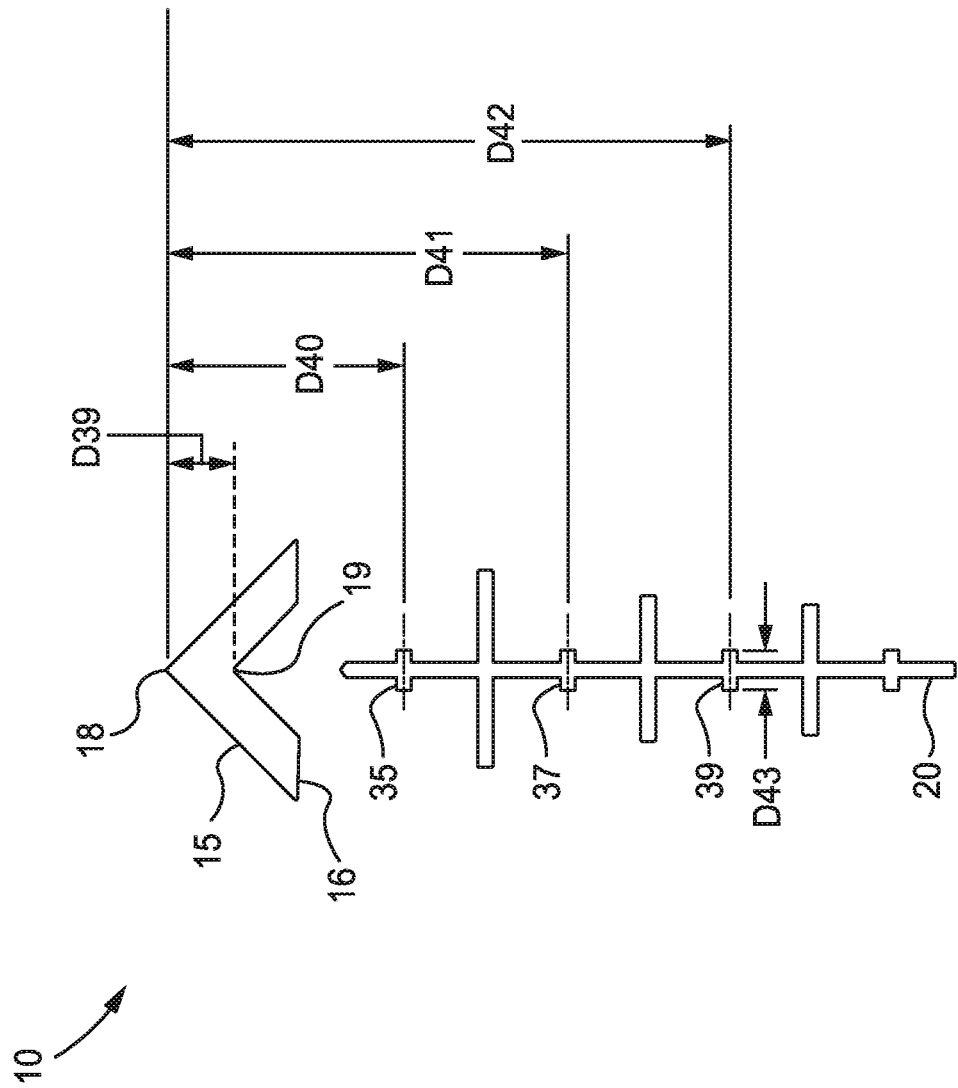
FIG. 17 is another front view of the reticle of FIG. 16.
Figure 18:
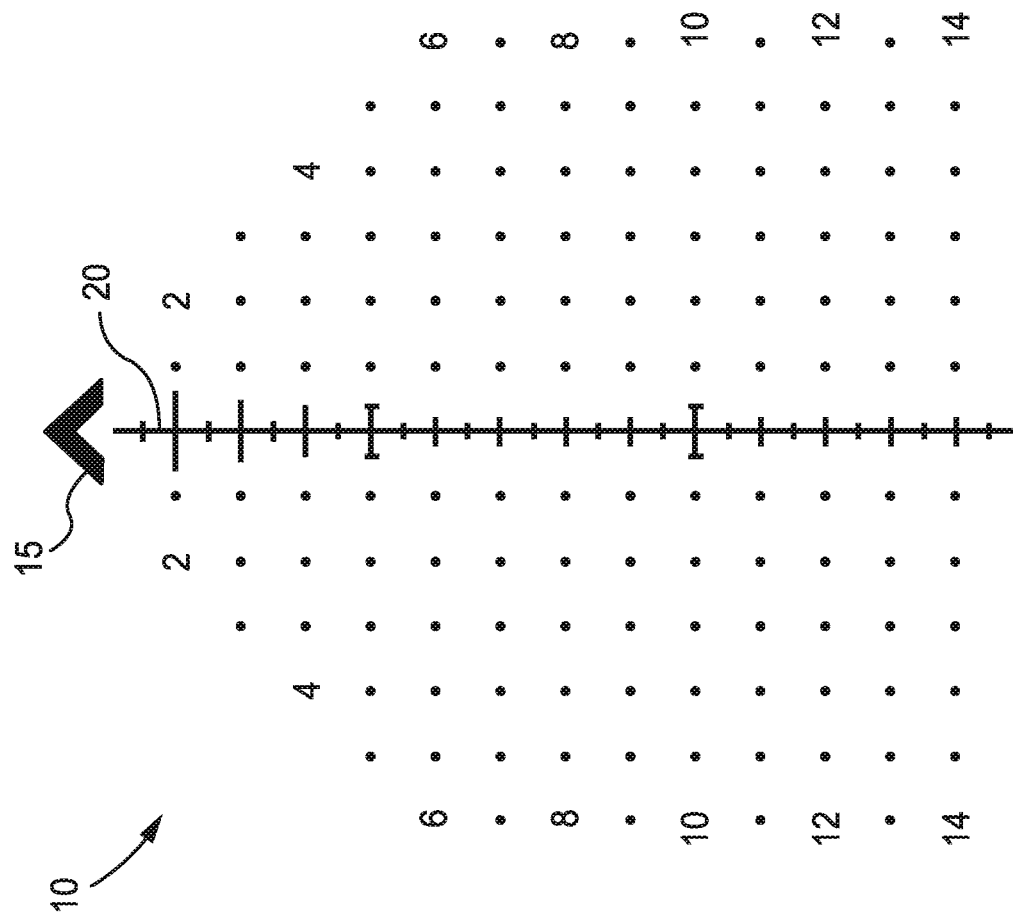
FIG. 18 is a front view of another embodiment of a reticle of the present disclosure.

In another embodiment as shown in FIGS. 16 and 17, a reticle 10 similar as the reticle 10 described in reference to FIG. 3 may be provided that integrates half-MRADs (or half-MILs) according to the first four (4) MRADs of the reticle 10—see also the embodiment of the reticle 10 of FIG. 18 that integrates half-MRADs out to 15.0 MRADs. Indicia layout information including measurements for the reticle 10 of FIGS. 16 and 17 is provided in Table 14. In this embodiment of the reticle 10, the lower tip 19 of the central aiming mark 15 is the half-MRAD mark or 0.5 MRAD mark, the horizontal mark 35 is the 1.5 MRAD mark, the horizontal mark 37 is the 2.5 MRAD mark and the horizontal mark 39 is the 3.5 MRAD mark.

TABLE 14

|  | MRAD | MOA |
|---|---|---|
| D39: | 0.5 | 1.79 |
| D40: | 1.5 | 5.157 |
| D41: | 2.5 | 8.595 |
| D42: | 3.5 | 12.033 |
| D43: | 0.25 | 0.8595 |

Figure 19:
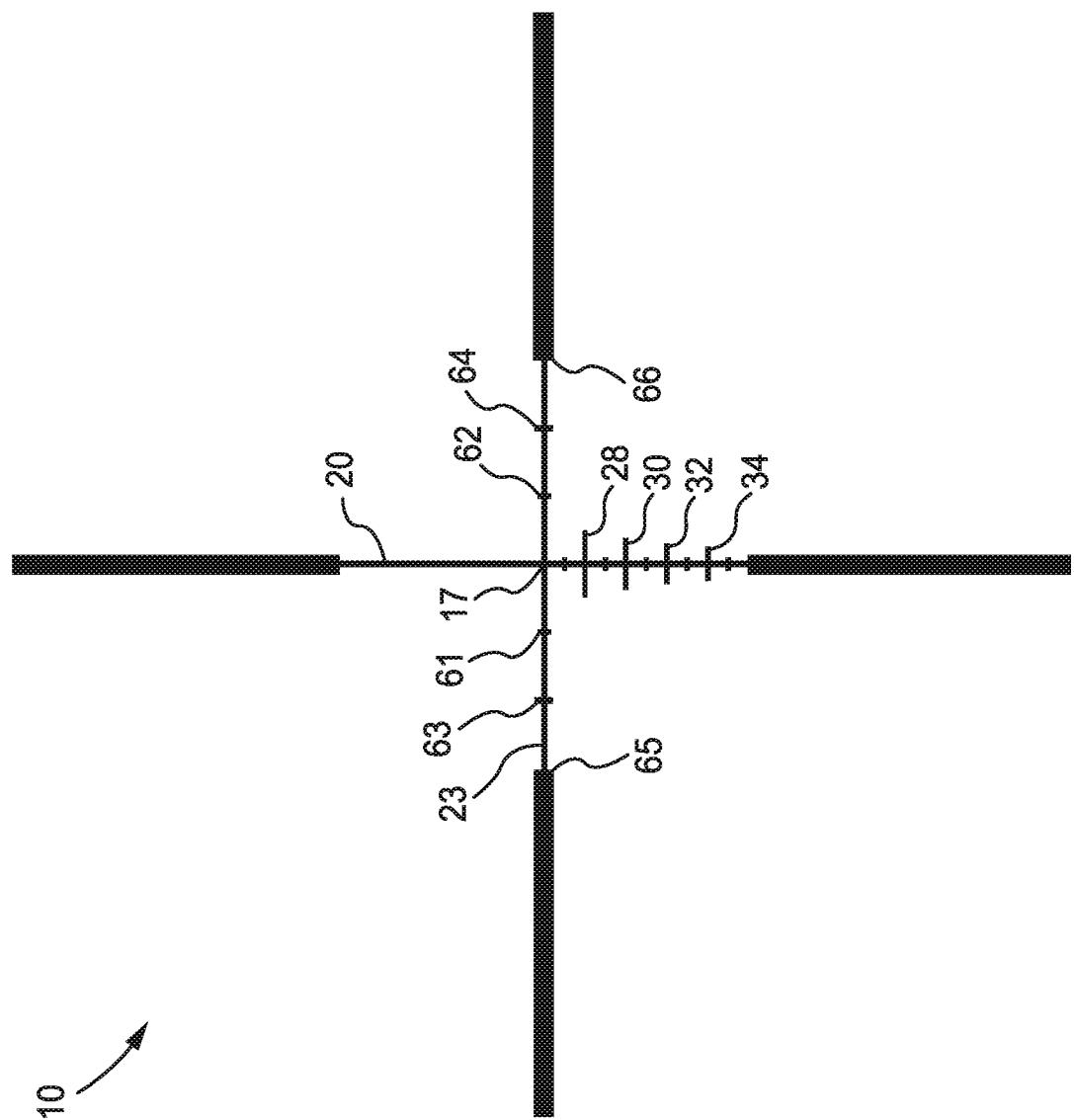
FIG. 19 is a front view of another embodiment of a reticle of the present disclosure.

As stated above, in one embodiment a reticle 10 of this disclosure may comprise a centrally located first measurement mark comprising two or more indicia operationally configured to provide a point of origin of the reticle 10 at an optical center of an optical sight 90 and operationally configured to provide a first horizontal ranging mark of the reticle 10 for auto ranging a target 99 at a predetermined distance. As an example, a reticle 10 as shown in FIG. 19 may comprise a first measurement mark comprising a point of origin of the reticle 10 defined by a point of intersect 17 between a second measurement mark comprising a central vertical line or central vertical crosshair 20 and a fifth measurement mark comprising a central horizontal line or central horizontal crosshair 23 including a central vertical crosshair 20 that extends above the central horizontal crosshair 23. Herein, the central vertical crosshair 20 may also be referred to as a "primary vertical crosshair" and the central horizontal crosshair may also be referred to as a "primary horizontal crosshair" of the reticle 10. In this embodiment, the point of intersect 17 defines an optical center of an optical sight 90 and is operationally configured as a zero range target aiming mark of the reticle 10. Although each of the central vertical crosshair 20 and the central horizontal crosshair 23 are shown as solid lines, in another embodiment the central vertical crosshair 20 and/or the central horizontal crosshair 23 may comprise separate or individual marks and/or segmented lines. In another embodiment, a point of intersect 17 may be defined by two or more central vertical lines and two or more central horizontal lines that do not intersect at an optical center of an optical sight 90. In another embodiment, a point of intersect 17 may be defined by two or more central vertical lines and two or more central horizontal lines including intersecting lines at an optical center of an optical sight 90.

The first measurement mark further comprises a horizontal hairline or crosshair 28 located below the point of intersect 17 operationally configured as a first horizontal ranging mark of the reticle 10 for horizontal auto ranging of a target such as an enemy combatant 99 at a distance of or about 300.0 yards according to the width of the horizontal crosshair 28. In this embodiment, the width of the horizontal crosshair 28 is 1.67 MRADs, which corresponds to a center mass of 45.7 cm (18.0 inches) of an enemy combatant 99 at 300.0 yards.

Similar as described above in reference to the reticle 10 of FIG. 3, the reticle 10 of FIG. 19 comprises one or more third measurement marks comprising horizontal crosshairs 30, 32, 34 operationally configured as horizontal target auto ranging marks of an enemy combatant 99, and other targets, at distances of or about 400.0 yards (horizontal crosshair 30), 500.0 yards (horizontal crosshair 32), and 600.0 yards (horizontal crosshair 34) according to the width of each of the horizontal crosshairs 30, 32, 34. Although the horizontal crosshairs 28, 30, 32, 34 are shown as solid straight lines, in another embodiment one or more of the horizontal crosshairs 28, 30, 32, 34 may comprise separate or individual marks and/or segmented lines defining a width operationally configured as horizontal target auto ranging marks for horizontally auto ranging a target such as an enemy combatant 99. In this embodiment, the width of the horizontal crosshair 30 is 1.25 MRADs, which corresponds to a center mass of 45.7 cm (18.0 inches) of an enemy combatant 99 at 400.0 yards; the width of the horizontal crosshair 32 is 1.0 MRAD, which corresponds to a center mass of 45.7 cm (18.0 inches) of an enemy combatant 99 at 500.0 yards; and the width of the horizontal crosshair 34 is 0.83 MRAD, which corresponds to a center mass of 45.7 cm (18.0 inches) of an enemy combatant 99 at 600.0 yards.

In this embodiment, the horizontal crosshair 28 subtends one (1.0) MRAD from the point of intersect 17, the horizontal crosshair 30 subtends two (2.0) MRADs from the point of intersect 17, the horizontal crosshair 32 subtends three (3.0) MRADs from the point of intersect 17 and the horizontal crosshair 34 subtends four (4.0) MRADs from the point of intersect 17. As such, the horizontal crosshairs 28, 30, 32, 34 of this embodiment may be referred to as secondary horizontal crosshairs operationally configured as MRAD subtension marks for the first four (4.0) MRADs of the reticle 10 and as bullet drop compensation marks at incremental distances of 300.0 yards, 400.0 yards, 500.0 yards and 600.0 yards.

Similar as described in reference to FIG. 16, the reticle 10 of FIG. 19 may integrate half-MRADS according to the first four (4) MRADs of the reticle 10—shown in FIG. 19 as additional third measurement marks comprising horizontal hash marks bisected by the central vertical crosshair 20. For example, the reticle 10 may include one or more horizontal hash marks disposed along the central vertical crosshair 20 including (1) a 0.5 MRAD mark located between the central horizontal crosshair 23 and the horizontal crosshair 28, (2) a 1.5 MRAD mark located between horizontal crosshair 28 and horizontal crosshair 30, (3) a 2.5 MRAD mark located between horizontal crosshair 30 and horizontal crosshair 32, and (4) a 3.5 MRAD mark located between horizontal crosshair 32 and horizontal crosshair 34 as shown in FIG. 19.

A reticle 10 as shown in the embodiment of FIG. 19 may also integrate moving target lead marks such as walking lead marks 61 and 62 and/or jogging lead marks 63 and 64 and/or running or sprinting lead marks 65 and 66 into the angular measurement of the reticle 10. In this embodiment, walking lead marks 61 and 62 and/or jogging lead marks 63 and 64 and/or running or sprinting lead marks 65 and 66, shown as vertical hash marks, are located along the central horizontal crosshair 23 although moving target lead marks may be located above and/or below the central horizontal crosshair 23 in another embodiment of the reticle 10. For purposes of this disclosure, a target such as an enemy combatant 99 walking right to left or left to right is determined to be traveling at a speed of or about 4.99 km/h (3.1 mph). A target such as an enemy combatant 99 jogging right to left or left to right is determined to be traveling at a speed of or about 9.82 km/h (6.1 mph). A target such as an enemy combatant 99 running or sprinting right to left or left to right is determined to be traveling at a speed of or about 13.8 km/h (8.6 mph).

As described above in reference to Tables 6-8, the reticle 10 of FIG. 19 is also operationally configured for use by one or more firearm/ammo combinations zeroed at one or more distances out to a distance of or about 600.0 yards according to the first four (4.0) whole MRAD subtensions of the reticle 10.

Figure 20:
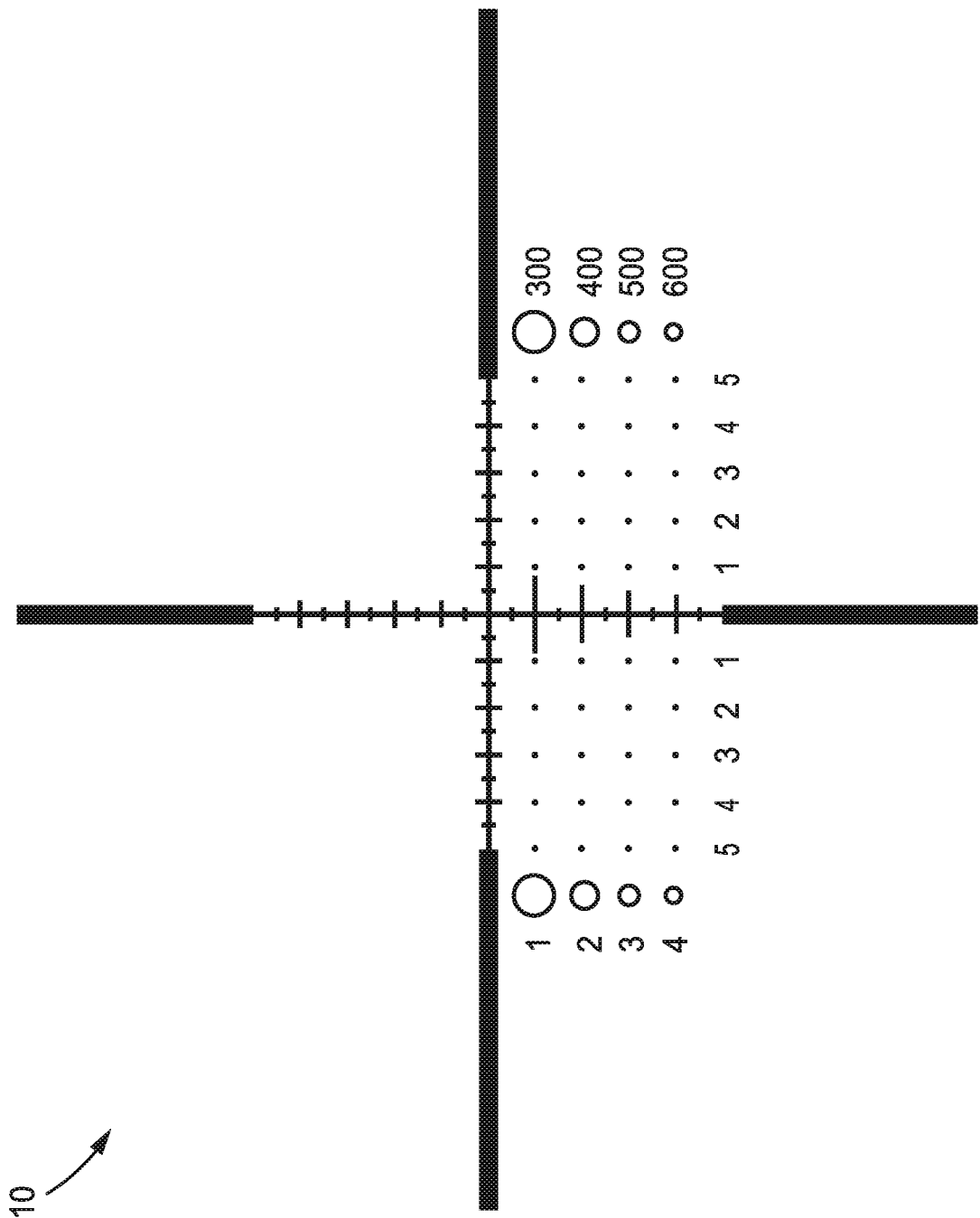
FIG. 20 is a front view of another embodiment of a reticle of the present disclosure.
Figure 21:
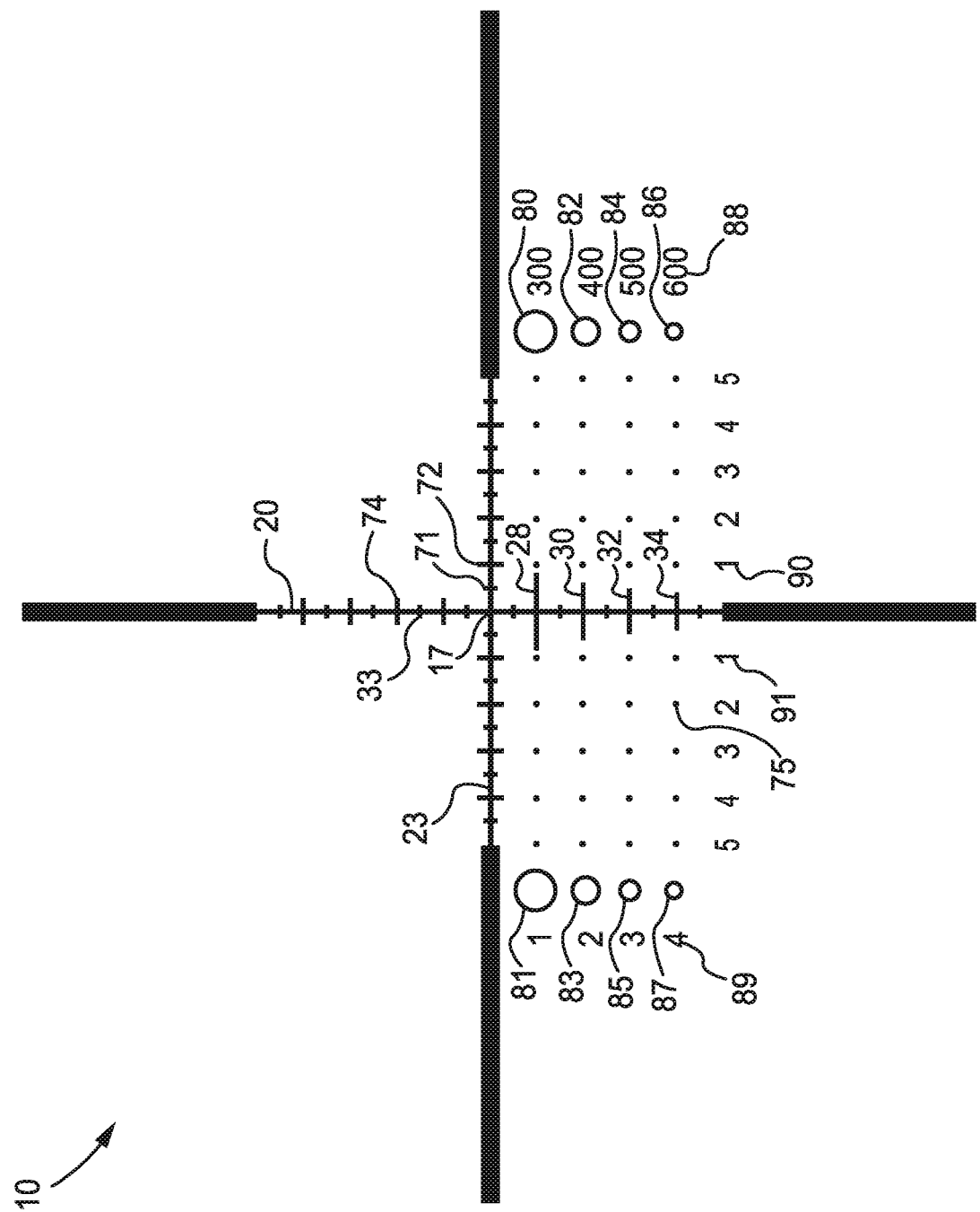
FIG. 21 is another front view of the reticle of FIG. 20.
Figure 22:
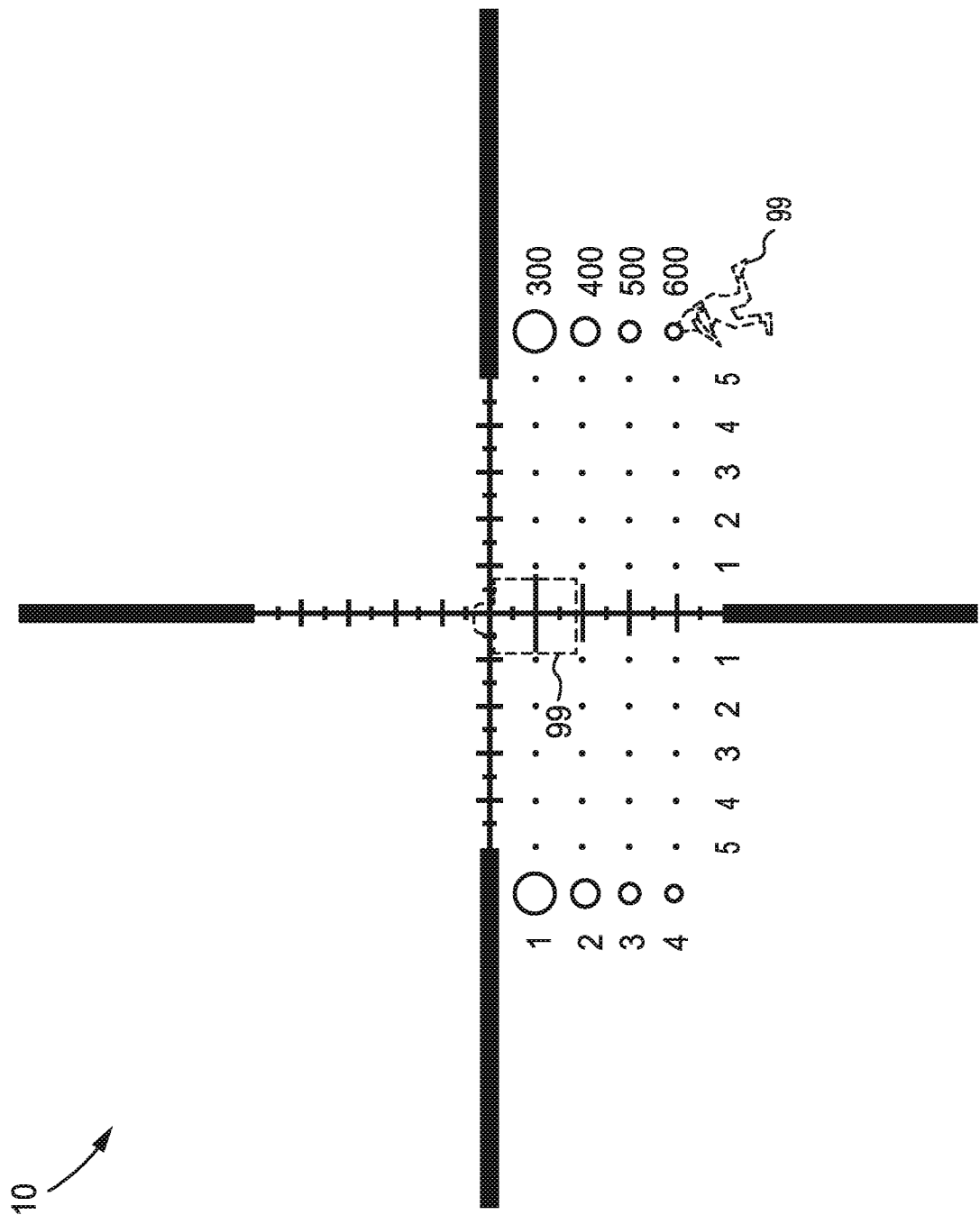
FIG. 22 is another front view of the reticle of FIG. 20.

With reference to FIGS. 20-22, in addition to one or more features described above, a reticle 10 of this disclosure may further comprise moving target aiming by integrating moving target ranging marks and moving target lead marks into the angular measurement of the reticle 10. Although a reticle 10 as shown in FIGS. 20-22 may be provided as a MRAD reticle or as a MOA reticle, the reticle 10 is described herein in terms of a MRAD reticle.

Similar as described in reference to the reticle 10 of FIG. 19, the reticle 10 of FIGS. 20-22 comprises a first measurement mark comprising a point of origin of the reticle 10 defined by a point of intersect 17 between a central vertical crosshair 20 and a central horizontal crosshair 23, in which the point of intersect 17 defines an optical center of an optical sight 90 and is operationally configured as a zero range target aiming mark. The first measurement mark also comprises a horizontal hairline or crosshair 28 located below the point of intersect 17 operationally configured as a first horizontal ranging mark of the reticle 10 for horizontal auto ranging of a target such as an enemy combatant 99 at a distance of or about 300.0 yards (see FIG. 22). Referring to FIG. 21, the reticle 10 also includes a second measurement mark comprising central vertical crosshair 20 and one or more third measurement marks comprising horizontal crosshairs 30, 32, 34 operationally configured as horizontal target auto ranging marks of an enemy combatant 99 and other targets at distances of or about 400.0 yards (horizontal crosshair 30), 500.0 yards (horizontal crosshair 32), and 600.0 yards (horizontal crosshair 34). In this embodiment, the width of the horizontal crosshair 28 is 1.67 MRADs, which corresponds to a center mass of 45.7 cm (18.0 inches) of an enemy combatant 99 at 300.0 yards; the width of the horizontal crosshair 30 is 1.25 MRADs, which corresponds to a center mass of 45.7 cm (18.0 inches) of an enemy combatant 99 at 400.0 yards; the width of the horizontal crosshair 32 is 1.0 MRAD, which corresponds to a center mass of 45.7 cm (18.0 inches) of an enemy combatant 99 at 500.0 yards; and the width of the horizontal crosshair 34 is 0.83 MRAD, which corresponds to a center mass of 45.7 cm (18.0 inches) of an enemy combatant 99 at 600.0 yards.

Still referring to the embodiment of FIGS. 20-22, the horizontal crosshair 28 subtends one (1.0) MRAD from the point of intersect 17, the horizontal crosshair 30 subtends two (2.0) MRADs from the point of intersect 17, the horizontal crosshair 32 subtends three (3.0) MRADs from the point of intersect 17 and the horizontal crosshair 34 subtends four (4.0) MRADs from the point of intersect 17. As such, the horizontal crosshairs 28, 30, 32, 34 may be referred to as secondary horizontal crosshairs operationally configured as MRAD subtension marks of incremental value, e.g., for the first four (4.0) whole MRADs of the reticle 10 and as bullet drop compensation marks at distances of 300.0 yards (horizontal crosshair 28), 400.0 yards (horizontal crosshair 30), 500.0 yards (horizontal crosshair 32), and 600.0 yards (horizontal crosshair 34).

With further reference to FIG. 21, the reticle 10 may also integrate half-MRAD according to the first four (4) MRADs of the reticle 10—shown in FIG. 21 as additional third measurement marks comprising horizontal hash marks bisected by the central vertical crosshair 20. For example, the reticle 10 may include one or more horizontal marks disposed along the central vertical crosshair 20 including (1) a 0.5 MRAD mark located between the central horizontal crosshair 23 and the horizontal crosshair 28, (2) a 1.5 MRAD mark located between horizontal crosshair 28 and horizontal crosshair 30, (3) a 2.5 MRAD mark located between horizontal crosshair 30 and horizontal crosshair 32, and (4) a 3.5 MRAD mark located between horizontal crosshair 32 and horizontal crosshair 34. The reticle 10 may also include whole MRAD marks 74 and half-MRAD horizontal hash marks 33 located on the central vertical crosshair 20 above the central horizontal crosshair 23 as shown.

Still referring to FIG. 21, the reticle 10 may comprise one or more fourth measurement marks comprising a grid including one or more marks integrated into the reticle 10 and operationally configured as bullet drop compensation marks, one or more marks operationally configured as auto ranging marks for one or more targets, one or more marks operationally configured as wind adjustment marks, one or more marks operationally configured as moving target lead marks, wherein the grid is operationally configured as aiming marks for exact firing using ballistic data. As shown, the grid includes evenly-spaced downwardly extending marks including one or more target auto ranging marks 80, 82, 84, 86 located to the right of the central vertical crosshair 20, one or more target auto ranging marks 81, 83, 85, 87 located to the left of the central vertical crosshair 20 and one or more aiming marks 75 disposed between each of the target auto ranging marks 80-87 and the horizontal crosshairs 28, 30, 32, 34. In this embodiment, each of the target auto ranging marks 80-87 is depicted in the shape of a circle and the one or more aiming marks 75 are depicted as dots. Other shapes and forms of target auto ranging marks 80-87 and aiming marks 75 are herein contemplated as described above.

In this embodiment, the target auto ranging marks 80-87 are operationally configured to auto range a moving target and/or a stationary target or at least part of a moving target and/or part of a stationary target such as a head portion of an enemy combatant 99 at a particular distance. As such, the target auto ranging marks 80-87 may also be referred to as "moving target auto ranging marks 80-87." Suitably, each of the target auto ranging marks 80-87 includes an angular measurement corresponding to a particular size target 99 at a particular distance. In this embodiment, the outer diameter or outer width of each of the target auto ranging marks 80-87 includes an angular measurement corresponding to a head portion of an enemy combatant 99 having a size of or about 25.4 cm (10.0 inches) in width at a particular distance. In this embodiment, each of the target auto ranging marks 80 and 81 is 0.92 MRAD (3.15 MOA) and operationally configured to auto range a head portion of an enemy combatant 99 at a distance of or about 300.0 yards; each of the target auto ranging marks 82 and 83 is 0.69 MRAD (2.39 MOA) and operationally configured to auto range a head portion of an enemy combatant 99 at a distance of or about 400.0 yards; each of the target auto ranging marks 84 and 85 is 0.55 MRAD (1.9 MOA) and operationally configured to auto range a head portion of an enemy combatant 99 at a distance of or about 500.0 yards; and each of the target auto ranging marks 86 and 87 is 0.46 MRAD (1.59 MOA) and operationally configured to auto range a head portion of an enemy combatant 99 at a distance of or about 600.0 yards.

In this embodiment, the one or more aiming marks 75 are operationally configured as MRAD marks correlated to the horizontal crosshairs 28, 30, 32, 34 according to the first four (4.0) MRADs of the reticle 10. In addition, the one or more aiming marks 75 are operationally configured as MRAD marks out to five (5.0) MRADS on either side of the central vertical crosshair 20. Suitably, the one or more aiming marks 75 are operationally configured as bullet drop compensation marks, as wind adjustment marks, as moving target lead marks and as aiming marks for exact firing using ballistic data. In addition, the target auto ranging marks 80-87 are also operationally configured as MRAD marks correlated or aligned horizontally with the horizontal crosshairs 28, 30, 32, 34 according to the first four (4.0) MRADs of the reticle 10 as shown and correlated with the one or more aiming marks 75 wherein the target auto ranging marks 80-87 are operationally configured as 6.0 MRAD marks on either side of the central vertical crosshair 20 according to the center point of each of the target auto ranging marks 80-87. As such, the auto ranging marks 80-87 and the one or more aiming marks 75 are operationally configured for holdover purposes up to 6.0 MRAD off center, i.e., on either side of the central vertical crosshair 20.

In exemplary operation, a user of the reticle 10 may auto range an enemy combatant 99 by aligning the head portion of the enemy combatant 99 within the target auto ranging mark 80, 82, 84 or 86 that corresponds in size to the head portion of the enemy combatant 99. In one non-limiting example including an enemy combatant 99 traveling right to left as shown in FIG. 22, a user of the reticle 10 may auto range the enemy combatant 99 by aligning the head portion of the enemy combatant 99 within the target auto ranging mark 80, 82, 84 or 86 that corresponds in size to the head portion of the enemy combatant 99. In the example of FIG. 22, an enemy combatant 99 is auto ranged at a distance of 600.0 yards as the head portion of the enemy combatant 99 corresponds in size to target auto ranging mark 86. Depending on whether the enemy combatant 99 is walking, jogging or running, a shooter may use one or more of the MRAD aiming marks 75 as moving target lead marks for proper aiming of the enemy combatant 99. For example, in an embodiment including an enemy combatant 99 running right to left and auto ranged at a distance of 300.0 yards using target auto ranging mark 80, a shooter may use information, e.g., Data on Previous Engagement or "DOPE", to lead the enemy combatant 99 a total of 4.5 MRADs using the MRAD aiming marks 75 located between the central vertical crosshair 20 and the target auto ranging mark 80.

Referring to FIG. 21, to further assist a user of the reticle 10, the grid may also include one or more numerical characters provided as distance numerals 88 indicating distances corresponding to 300.0 yards, 400.0 yards, 500.0 yards and 600.0 yards. In this embodiment, distance numerals 88 are depicted as numerical characters 300, 400, 500, and 600 corresponding to target auto ranging marks 80, 82,

84, 86. In another embodiment, distance numerals 88 may be depicted corresponding to target auto ranging marks 81, 83, 85, 87 in addition to or in the alternative to the distance numerals 88 as shown.

As further shown in FIG. 21, the grid may also include one or more numerical characters 89 provided as MRAD indicators corresponding to the first four (4.0) MRADs of the reticle 10, for example, the numerical character "1" located to the left of target auto ranging mark 81 represents 1.0 MRAD from central horizontal crosshair 23. Similarly, the grid may also include one or more numerical characters 90, 91 provided as MRAD indicators for corresponding MRAD aiming marks out to five (5.0) MRADS on either side of the central vertical crosshair 20. The central horizontal crosshair 23 may also comprise one or more half-MRAD marks 71 and one or more whole MRAD marks 72 integrated into the reticle 10 as aiming points.

As described above in reference to Tables 6-8, the reticle 10 of FIGS. 20-22 is also operationally configured for use by one or more firearm/ammo combinations zeroed at one or more distances out to a distance of or about 600.0 yards according to the first four (4.0) whole MRAD subtensions of the reticle 10.

As described above, the target auto ranging marks 80-87 of the reticle 10 of FIGS. 20-22 are operationally configured as auto ranging marks for auto ranging a moving target and/or a stationary target or part of a moving target and/or part of a stationary target such as a head portion of an enemy combatant 99 at a particular distance. In another embodiment as shown in FIGS. 23-24, the target auto ranging marks 80-87 may be operationally configured as one or more moving target and/or stationary target auto ranging marks, one or more moving target auto lead marks and one or more moving target auto bullet drop compensation marks of the reticle 10 by locating each of the target auto ranging marks 80-87 a distance from the central vertical crosshair 20 effective as moving target auto lead marks.

Figure 23:
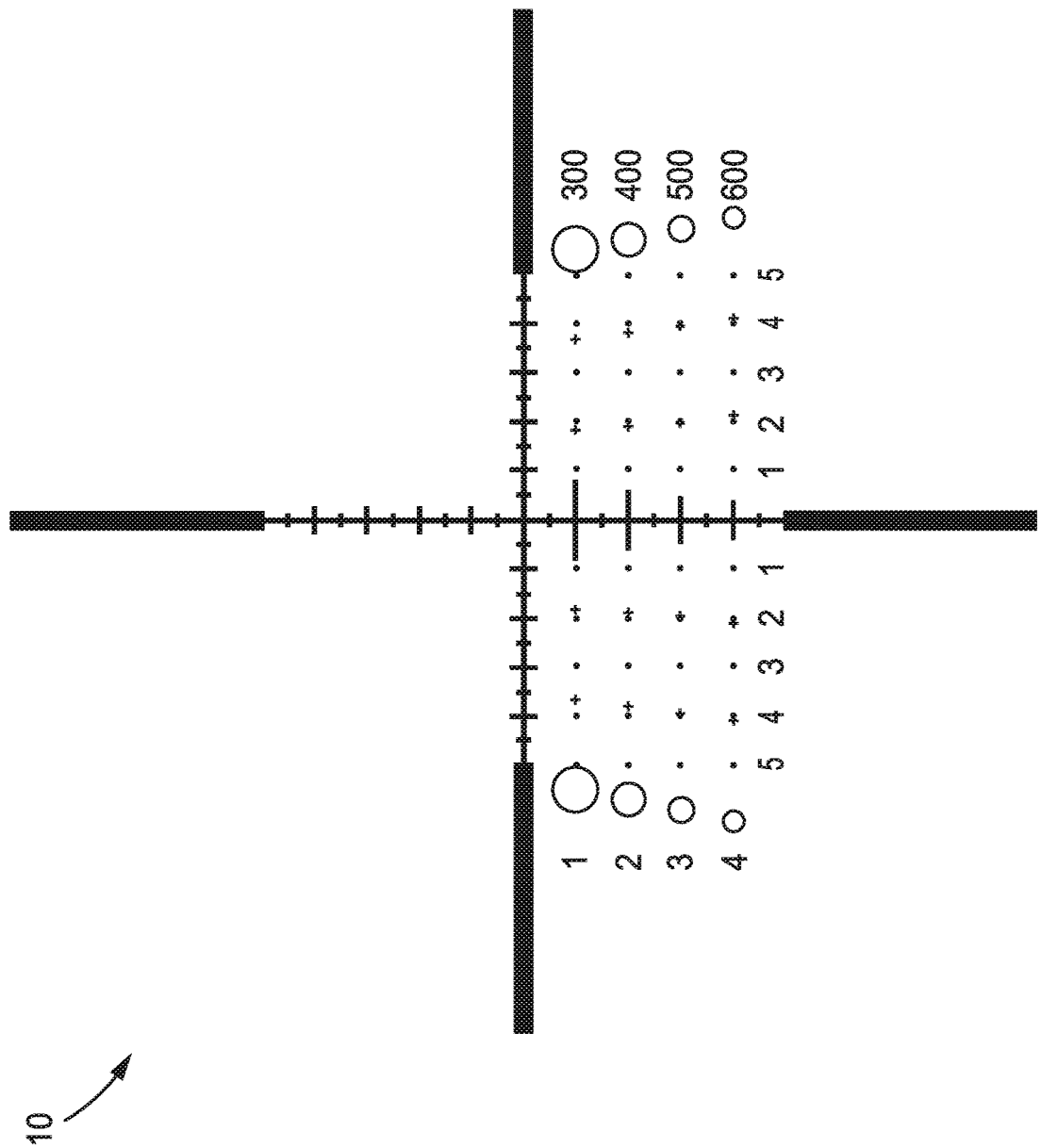
FIG. 23 is a front view of another embodiment of a reticle of the present disclosure.
Figure 24:
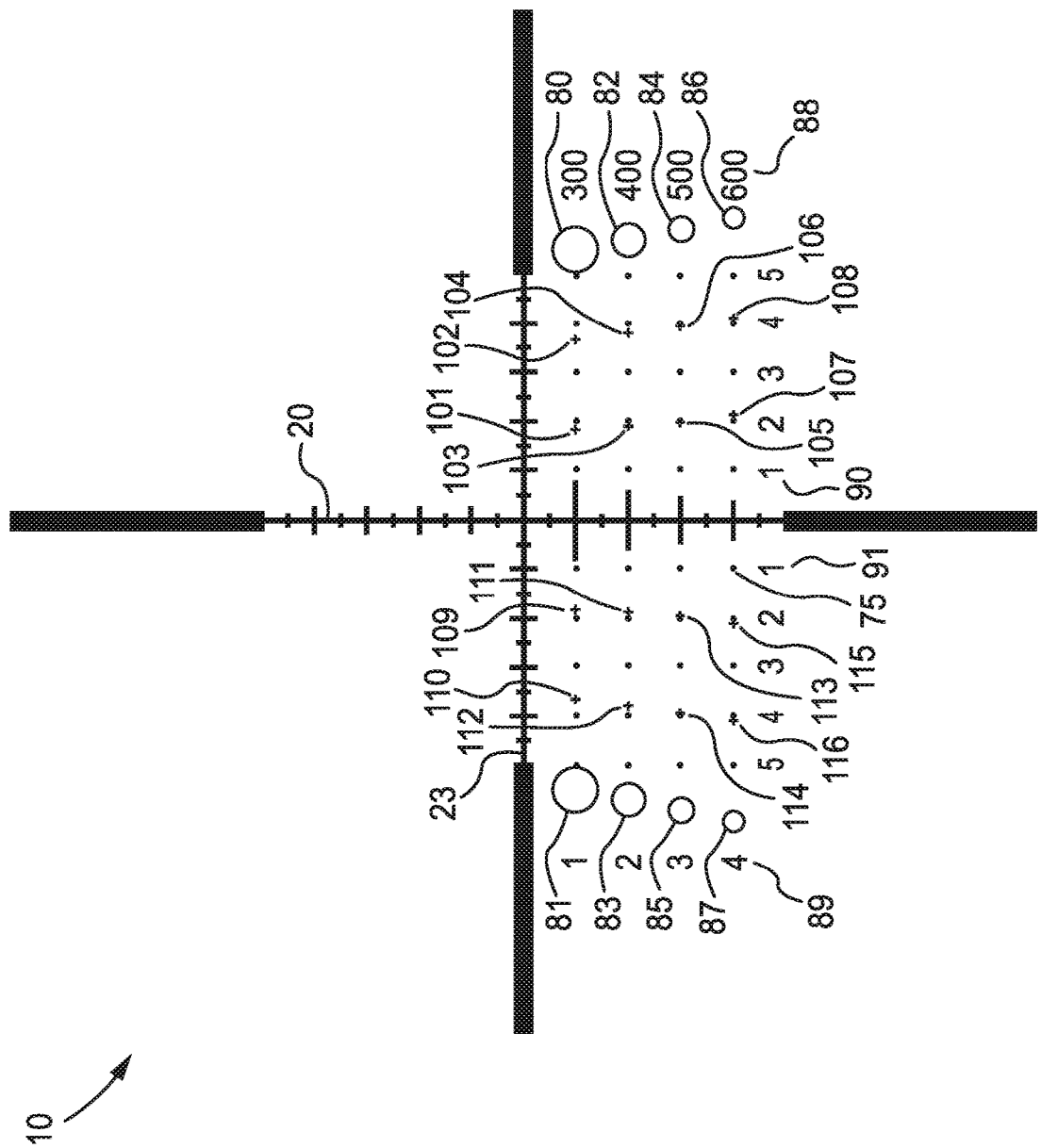
FIG. 24 is another front view of the reticle of FIG. 23.

Similar as shown and described in reference to the reticle 10 of FIGS. 20-22, the reticle 10 as shown in FIGS. 23-24 includes a first measurement mark comprising a point of origin of the reticle 10 defined by a point of intersect 17 between a central vertical crosshair 20 and a central horizontal crosshair 23 in which the point of intersect 17 defines an optical center of an optical sight 90 and is operationally configured as a zero range target aiming mark. The first measurement mark also comprises a horizontal hairline or crosshair 28 located below the point of intersect 17 operationally configured as a first horizontal ranging mark of the reticle 10 for horizontal auto ranging of a target such as an enemy combatant 99 at a distance of or about 300.0 yards. Likewise, the reticle 10 of this embodiment includes a second measurement mark comprising central vertical crosshair 20 and one or more third measurement marks comprising horizontal crosshairs 30, 32, 34 operationally configured as horizontal target auto ranging marks of an enemy combatant 99 and other targets at distances of or about 400.0 yards (horizontal crosshair 30), 500.0 yards (horizontal crosshair 32), and 600.0 yards (horizontal crosshair 34). Similar as above, the width of the horizontal crosshair 28 is 1.67 MRADs, which corresponds to a center mass of 45.7 cm (18.0 inches) of an enemy combatant 99 at 300.0 yards; the width of the horizontal crosshair 30 is 1.25 MRADs, which corresponds to a center mass of 45.7 cm (18.0 inches) of an enemy combatant 99 at 400.0 yards; the width of the horizontal crosshair 32 is 1.0 MRAD, which corresponds to a center mass of 45.7 cm (18.0 inches) of an enemy combatant 99 at 500.0 yards; and the width of the horizontal crosshair 34 is 0.83 MRAD, which corresponds to a center mass of 45.7 cm (18.0 inches) of an enemy combatant 99 at 600.0 yards. Also similar as above, the horizontal crosshair 28 subtends one (1.0) MRAD from the point of intersect 17, the horizontal crosshair 30 subtends two (2.0) MRADs from the point of intersect 17, the horizontal crosshair 32 subtends three (3.0) MRADs from the point of intersect 17 and the horizontal crosshair 34 subtends four (4.0) MRADs from the point of intersect 17, wherein the horizontal crosshairs 28, 30, 32, 34 are operationally configured as MRAD subtension marks of incremental value, e.g., for the first four (4.0) whole MRADs of the reticle 10 and as bullet drop compensation marks at distances of 300.0 yards (horizontal crosshair 28), 400.0 yards (horizontal crosshair 30), 500.0 yards (horizontal crosshair 32), and 600.0 yards (horizontal crosshair 34).

With further reference to FIGS. 23-24, the reticle 10 may also integrate half-MRAD according to the first four (4) MRADs of the reticle 10 as additional third measurement marks comprising horizontal hash marks bisected by the central vertical crosshair 20 similar as described in reference to the reticle 10 depicted in FIGS. 20-22. The reticle 10 depicted in FIGS. 23-24 may also include whole MRAD marks 74 and half-MRAD horizontal hash marks 33 located on the central vertical crosshair 20 above the central horizontal crosshair 23 similar as shown in FIG. 21.

In the embodiment of FIGS. 23-24, the target auto ranging marks 80-87 are operationally configured to auto range a moving target and/or a stationary target or part of a moving target and/or part of a stationary target such as a head portion of an enemy combatant 99 at a particular distance similar as described in reference to the reticle 10 of FIGS. 20-22. As such, the outer diameter of each of the target auto ranging marks 80-87 includes an angular measurement corresponding to a head portion of an enemy combatant 99 having a size of or about 25.4 cm (10.0 inches) in width at a particular distance. In this embodiment, each of the target auto ranging marks 80 and 81 is 0.92 MRAD and operationally configured to auto range a head portion of an enemy combatant 99 at a distance of or about 300.0 yards; each of the target auto ranging marks 82 and 83 is 0.69 MRAD and operationally configured to auto range a head portion of an enemy combatant 99 at a distance of or about 400.0 yards; each of the target auto ranging marks 84 and 85 is 0.55 MRAD and operationally configured to auto range a head portion of an enemy combatant 99 at a distance of or about 500.0 yards; and each of the target auto ranging marks 86 and 87 is 0.46 MRAD and operationally configured to auto range a head portion of an enemy combatant 99 at a distance of or about 600.0 yards.

Whereas the target auto ranging marks 80-87 in the embodiment of the reticle 10 of FIGS. 20-22 are aligned vertically as 6.0 MRAD marks on either side of the central vertical crosshair 20, in the embodiment of the reticle 10 of FIGS. 23-24 the target auto ranging marks 80-87 are located on either side of the central vertical crosshair 20 at angular measurements effective as moving target lead marks for an enemy combatant 99 or other target running or sprinting right to left or left to right at a speed of or about 13.8 km/h (8.6 mph). As such, the target auto ranging marks 80-87 may also be referred to as running or sprinting lead marks. In operation, a user of the reticle 10 may auto range a running enemy combatant 99 by aligning the head portion of the enemy combatant 99 within the target auto ranging mark 80-87 that corresponds in size to the head portion of the enemy combatant 99 according to the direction that the enemy combatant 99 is running, e.g., running right to left or left to right. Thereafter, the target auto ranging mark 80-87 used to range the enemy combatant 99 is further operationally configured as a running or sprinting lead mark whereby a user of the reticle 10 does not have to make any further adjustments to lead the enemy combatant 99, i.e., the user does not have to move the enemy combatant 99 from a target auto ranging mark 80-87 to a different mark of the reticle 10 for purposes of leading the enemy combatant 99. Likewise, the subtension values of the target auto ranging marks 80-87 allows each of the target auto ranging marks 80-87 to further be utilized as a bullet drop compensation mark so that once an enemy combatant 99 is auto ranged using a particular target auto ranging marks 80-87 according to the direction the enemy combatant 99 is running, the particular target auto ranging mark 80-87 used further operates as an auto lead mark and as an auto bullet drop compensation mark for firing purposes.

In addition, the reticle 10 may also include marks on either side of the central vertical crosshair 20 at angular measurements effective as walking lead marks 101, 103, 105, 107, 109, 111, 113, 115 and/or jogging lead marks 102, 104, 106, 108, 110, 112, 114, 116. In addition, one or more walking lead marks and/or jogging lead marks may overlap with one or more aiming marks 75 disposed between each of the target auto ranging marks 80-87 and the horizontal crosshairs 28, 30, 32, 34 wherein the one or more aiming marks 75 and one or more overlapping walking lead marks and/or jogging lead marks are operationally configured as exact firing marks using ballistic data.

Similar as described above, in the embodiment of FIGS. 23-24 each of the target auto ranging marks 80 and 81 is 0.92 MRAD (3.15 MOA) and operationally configured to auto range a head portion of an enemy combatant 99 at a distance of or about 300.0 yards; each of the target auto ranging marks 82 and 83 is 0.69 MRAD (2.39 MOA) and operationally configured to auto range a head portion of an enemy combatant 99 at a distance of or about 400.0 yards; each of the target auto ranging marks 84 and 85 is 0.55 MRAD (1.9 MOA) and operationally configured to auto range a head portion of an enemy combatant 99 at a distance of or about 500.0 yards; and each of the target auto ranging marks 86 and 87 is 0.46 MRAD (1.59 MOA) and operationally configured to auto range a head portion of an enemy combatant 99 at a distance of or about 600.0 yards. For operation as moving target lead marks, a center point of each of the target auto ranging marks 80-87 is located angular measurement from the central vertical crosshair 20 as described in Table 15. For operation as moving target lead marks, a center point of each of the jogging lead marks 102, 104, 106, 108, 110, 112, 114, 116 is located angular measurement from the central vertical crosshair 20 as described in Table 16. For operation as moving target lead marks, a center point of each of the walking lead marks 101, 103, 105, 107, 109, 111, 113, 115 is located angular measurement from the central vertical crosshair 20 as described in Table 17. The angular measurements of the reticle 10 as provided in Tables 15, 16 and 17 are established according to a bullet velocity ranging from or about 792.48 mps to or about 822.96 mps (from or about 2600.00 ft/s to or about 2700.00 ft/s). Without limiting the disclosure to any particular firearm/ammo combination, exemplary cartridges of one or more firearm/ammo combinations producing the above listed bullet velocity range include (1) 0.308, (2) 6.5 Creedmoor, and (3) 5.56 75-grain.

TABLE 15

|  | MRAD | MOA |
|---|---|---|
| Target Auto Ranging Marks 80 and 81 | 5.50 | 18.9 |
| Target Auto Ranging Marks 82 and 83 | 5.70 | 19.59 |
| Target Auto Ranging Marks 84 and 85 | 5.91 | 20.33 |
| Target Auto Ranging Marks 86 and 87 | 6.15 | 21.13 |

TABLE 16

|  | MRAD | MOA |
|---|---|---|
| Jogging Lead Marks 102 and 110 | 3.66 | 12.6 |
| Jogging Lead Marks 104 and 112 | 3.80 | 13.06 |
| Jogging Lead Marks 106 and 114 | 3.94 | 13.56 |
| Jogging Lead Marks 108 and 116 | 4.10 | 14.09 |

TABLE 17

|  | MRAD | MOA |
|---|---|---|
| Walking Lead Marks 101 and 109 | 1.83 | 6.3 |
| Walking Lead Marks 103 and 111 | 1.90 | 6.53 |
| Walking Lead Marks 105 and 113 | 1.97 | 6.78 |
| Walking Lead Marks 107 and 115 | 2.13 | 7.33 |

Although a reticle 10 as shown in FIGS. 23-24 may be provided as a MRAD reticle or as a MOA reticle, the reticle 10 is described herein in terms of a MRAD reticle.

As described above in reference to Tables 6-8, the reticle 10 of FIGS. 23-24 is also operationally configured for use by one or more firearm/ammo combinations zeroed at one or more distances out to a distance of or about 600.0 yards according to the first four (4.0) whole MRAD subtensions of the reticle 10.

Turning to FIG. 25, in another embodiment a reticle 10 of this disclosure may be graduated in MOA as an exact firing solution at one or more distances using ballistic data. Similar as described above in reference to FIGS. 6-9, the MOA reticle 10 of FIG. 23 may also be operationally configured to horizontally auto range a target such as an enemy combatant 99 at a distance of or about 300.0 yards using the base 16 of the central aiming mark 15 and horizontally auto range an enemy combatant 99 at distances of or about 400.0 yards, 500.0 yards and 600.0 using the horizontal crosshairs 30, 32, 34. In this embodiment, the uppermost edge 21 of the central vertical crosshair 20 is operationally configured as a MOA subtension mark (3.0 MOA mark) and the horizontal crosshairs 30, 32, 34 are operationally configured as incremental MOA subtension marks at 6.0 MOA, 10.0 MOA and 14.0 MOA. Similar as described above, the uppermost edge 21 of the central vertical crosshair 20 and the horizontal crosshairs 30, 32, 34 are operationally configured as bullet drop compensation marks at distances of 300.0 yards, 400.0 yards, 500.0 yards and 600.0 yards. The MOA reticle 10 of this embodiment is also operationally configured for use by one or more firearm/ammo combinations at varying zeroes (or zero ranges) out to a distance of or about 600.0 yards for rapid time on target aiming. In another embodiment, the MOA reticle 10 may correlate horizontal ranging to bullet drop compensation out to a distance of 500.0 meters or 600.0 meters depending on the firearm/ammo combination used.

Although particular embodiments of the reticle 10 are described above, in another embodiment one or more reticle marks may be modified to account for one or more changes in desired function of the reticle 10 and/or one or more changes in the environment of the reticle 10 and/or one or more other conditions.

The disclosure will be better understood with reference to the following non-limiting examples, which are illustrative only and not intended to limit the present disclosure to a particular embodiment.

Example 1

In a first non-limiting example, a reticle 10 as shown in FIG. 3 and in FIG. 19 may be described as a reticle 10 for an optical sight 90 graduated in angular measurement for use with one or more firearm/ammo combinations zeroed at one or more distances effective for use with the reticle 10 as described above, the reticle 10 comprising (1) a point of origin aiming mark at an optical center of the optical sight; and (2) subtension marks of incremental value providing bullet drop compensation at incremental distances according to at least some of the subtension marks and horizontal auto ranging correlated with the bullet drop compensation at the incremental distances of at least some of the subtension marks; the reticle 10 being operationally configured for exact firing using ballistic data.

Example 2

In a second non-limiting example, a reticle 10 as shown in FIG. 3, FIG. 19 and FIG. 20 may be described as a reticle 10 for an optical sight 90 graduated in angular measurement for use with one or more firearm/ammo combinations zeroed at one or more distances effective for use with the reticle 10 as described above, the reticle 10 comprising:

(1) a point of origin mark;
(2) at least a first mark for horizontal auto ranging a target at a distance of 300.0 yards, a second mark for horizontal auto ranging a target at a distance of 400.0 yards, a third mark for horizontal auto ranging a target at a distance of 500.0 yards and a fourth mark for horizontal auto ranging a target at a distance of 600.0 yards;
(3) wherein at least the second mark, the third mark and the fourth mark are angular measurement subtension marks; and
(4) wherein the second mark is operationally configured as a bullet drop compensation mark at a distance of 400.0 yards, the third mark is operationally configured as a bullet drop compensation mark at a distance of 500.0 yards and the fourth mark is operationally configured as a bullet drop compensation mark at a distance of 600.0 yards.

Example 3

In a third non-limiting example, a reticle 10 for an optical sight 90 as shown in FIG. 19, FIG. 20 and FIG. 23 is graduated in angular measurement for use with one or more firearm/ammo combinations zeroed at one or more distances effective for use with the reticle 10 as described above, the reticle 10 comprising (1) a point of origin aiming mark at an optical center of the optical sight; (2) angular measurement subtension marks of incremental value; (3) bullet drop compensation at incremental distances according to one or more of the angular measurement subtension marks; (4) horizontal auto ranging according to one or more of the angular measurement subtension marks; and (5) moving target lead marks; the reticle 10 being operationally configured for exact firing using ballistic data.

Example 4

In a fourth non-limiting example, a reticle 10 as shown in FIGS. 20-22 and FIGS. 23-24 may be described as a reticle 10 for an optical sight 90 graduated in angular measurement for use with one or more firearm/ammo combinations zeroed at one or more distances effective for use with the reticle 10 as described above, the reticle 10 comprising (1) a point of origin aiming mark 17 at an optical center of the optical sight; (2) angular measurement subtension marks 28, 30, 32, 34 of incremental value; (3) bullet drop compensation at incremental distances correlated with the subtension marks 28, 30, 32, 34; (4) horizontal target auto ranging at incremental distances correlated with the subtension marks 28, 30, 32, 34; and (5) moving target auto ranging correlated with the bullet drop compensation at the incremental distances; wherein the reticle 10 is operationally configured for exact firing at one or more distances using ballistic data. The incremental values of the subtension marks are 1.0 MRAD, 2.0 MRAD, 3.0 MRAD and 4.0 MRAD and the incremental distances are 300.0 yards, 400.0 yards, 500.0 yards and 600.0 yards. The reticle 10 further comprises one or more MRAD aiming marks 75 operationally configured as one or more exact firing aiming marks and one or more moving target lead marks.

Example 5

In a fifth non-limiting example, a reticle 10 as shown in FIGS. 20-22 and FIGS. 23-24 may be described as a reticle 10 for an optical sight 90 graduated in angular measurement for use with one or more firearm/ammo combinations zeroed at one or more distances effective for use with the reticle 10 as described above, the reticle 10 comprising:

a point of origin aiming mark 17;
a first target auto ranging mark (horizontal crosshair 28) for horizontally auto ranging a target at a distance of 300.0 yards;
a second target auto ranging mark (horizontal crosshair 30) for horizontally auto ranging a target at a distance of 400.0 yards;
a third target auto ranging mark (horizontal crosshair 32) for horizontally auto ranging a target at a distance of 500.0 yards;
a fourth target auto ranging mark (horizontal crosshair 34) for horizontally auto ranging a target at a distance of 600.0 yards; and
one or more moving target auto ranging marks (target auto ranging marks 80-87) for auto ranging a target at one or more predetermined distances;
wherein the first target auto ranging mark, the second target auto ranging mark, the third target auto ranging mark, and the fourth target auto ranging mark are subtension marks;
wherein the one or more moving target auto ranging marks subtend from the point of origin aiming mark in incremental values;
wherein the first auto ranging mark is operationally configured as bullet drop compensation mark at a distance of 300.0 yards, the second auto ranging mark is operationally configured as bullet drop compensation mark at a distance of 400.0 yards, the third auto ranging mark is operationally configured as bullet drop compensation mark at a distance of 500.0 yards, and the fourth auto ranging mark is operationally configured as bullet drop compensation mark at a distance of 600.0 yards;

wherein the incremental values of the subtension marks of the reticle 10 are 1.0 MRAD, 2.0 MRAD, 3.0 MRAD and 4.0 MRAD; and wherein the incremental distances are 300.0 yards, 400.0 yards, 500.0 yards and 600.0 yards.

Example 6

In a sixth non-limiting example, a reticle 10 as shown in FIGS. 20-22 and FIGS. 23-24 may be described as a reticle 10 for an optical sight 90 for use with one or more firearm/ammo combinations zeroed at one or more distances effective for use with the reticle 10 as described above, the reticle 10 comprising (1) a primary horizontal crosshair 23; (2) a primary vertical crosshair 20 intersecting the primary horizontal crosshair 23 defining a point of origin aiming mark 17 of the reticle 10; (3) a first secondary horizontal crosshair (horizontal crosshair 28) operationally configured as a 1.0 MRAD subtension mark and operationally configured as a bullet drop compensation mark and as a horizontal ranging mark of a target at a distance of 300.0 yards; (4) a second secondary horizontal crosshair (horizontal crosshair 30) operationally configured as a 2.0 MRAD subtension mark and operationally configured as a bullet drop compensation mark and as a horizontal ranging mark of a target at a distance of 400.0 yards; (5) a third secondary horizontal crosshair (horizontal crosshair 32) operationally configured as a 3.0 MRAD subtension mark and operationally configured as a bullet drop compensation mark and as a horizontal ranging mark of a target at a distance of 500.0 yards; (6) a fourth secondary horizontal crosshair (horizontal crosshair 34) operationally configured as a 4.0 MRAD subtension mark and operationally configured as a bullet drop compensation mark and as a horizontal ranging mark of a target at a distance of 600.0 yards; (7) a first moving target auto ranging mark 80 and/or 81 subtending 1.0 MRAD operationally configured to auto range a moving target at a distance of 300.0 yards; (8) a second moving target auto ranging mark 82 and/or 83 subtending 2.0 MRAD operationally configured to auto range a moving target at a distance of 400.0 yards; (9) a third moving target auto ranging mark 84 and/or 85 subtending 3.0 MRAD operationally configured to auto range a moving target at a distance of 500.0 yards; (10) a fourth moving target auto ranging mark 86 and/or 87 subtending 4.0 MRAD operationally configured to auto range a moving target at a distance of 600.0 yards; and (11) one or more MRAD aiming marks 75 correlated with the first secondary horizontal crosshair, the second secondary horizontal crosshair, the third secondary horizontal crosshair and the fourth secondary horizontal crosshair.

Example 7

In a seventh non-limiting example, a reticle 10 as shown in FIG. 3, FIG. 11, FIG. 16 and FIG. 19 may include a grid comprising target auto ranging marks 80-87 and one or more aiming marks 75 as shown in in FIGS. 20-22 and FIGS. 23-24.

Example 8

In an eighth non-limiting example, a reticle 10 as shown in FIGS. 20-22 and FIGS. 23-24 may be described in one or more of the following Embodiments 1-9.

Embodiment 1. A firearm optical sight reticle for use with one or more firearm/ammo combinations zeroed at one or more distances, comprising:
  graduated marks graduated in angular measurement including: a point of origin aiming mark;
    one or more first subtension marks of an incremental subtension value operationally configured as horizontal target auto ranging marks and bullet drop compensation marks at one or more incremental distances; and
    one or more second subtension marks of the incremental subtension value of the one or more first subtension marks operationally configured as moving target auto ranging marks and moving target lead marks at the one or more incremental distances;
  wherein one or more of the graduated marks are operationally configured as exact firing aiming marks.

Embodiment 2. The firearm optical sight reticle of Embodiment 1 wherein the one or more second subtension marks are operationally configured as one or more running lead marks and as one or more bullet drop compensation marks for one or more running targets auto ranged via the one or more second subtension marks.

Embodiment 3. The firearm optical sight reticle of Embodiment 1 wherein the graduated marks include one or more third subtension marks of the incremental subtension value comprising one or more jogging lead marks and one or more walking lead marks.

Embodiment 4. The firearm optical sight reticle of Embodiment 1 wherein each of the one or more first subtension marks is a horizontal target auto ranging mark at a particular distance of the one or more incremental distances.

Embodiment 5. The firearm optical sight reticle of Embodiment 4 wherein each of the one or more first subtension marks is a bullet drop compensation mark at a particular distance of the one or more incremental incremental distances.

Embodiment 6. The firearm optical sight reticle of Embodiment 1 wherein the one or more first subtension marks include incremental subtension values of 1.0 MRAD, 2.0 MRAD, 3.0 MRAD and 4.0 MRAD.

Embodiment 7. The firearm optical sight reticle of Embodiment 1 wherein the one or more incremental distances include incremental distances of 300.0 yards, 400.0 yards, 500.0 yards and 600.0 yards.

Embodiment 8. The firearm optical sight reticle of Embodiment 1 wherein the one or more second subtension marks are operationally configured as moving target auto ranging marks and moving target lead marks at incremental distances of 300.0 yards, 400.0 yards, 500.0 yards and 600.0 yards.

Embodiment 9. The firearm optical sight reticle of Embodiment 8 wherein the one or more second subtension marks include one or more second subtension marks having an angular measurement of 0.92 MRAD at the incremental distance of 300.0 yards, one or more second subtension marks having an angular measurement of 0.69 MRAD at the incremental distance of 400.0 yards, one or more second subtension marks having an angular measurement of 0.55 MRAD at the incremental distance of 500.0 yards and one or more second subtension marks having an angular measurement of 0.46 MRAD at the incremental distance of 600.0 yards.

Example 9

In a ninth non-limiting example, a reticle 10 as shown in FIGS. 23-24 may be described in one or more of the following Embodiments 1-3.

Embodiment 1. A firearm optical sight reticle for use with one or more firearm/ammo combinations zeroed at one or more distances, comprising:
- a point of origin aiming mark; and
- a first horizontal ranging mark of a first angular measurement subtension value for horizontal auto ranging of a target at a first distance;
- a second horizontal ranging mark of a second angular measurement subtension value for horizontal auto ranging of the target at a second distance;
- a third horizontal ranging mark of a third angular measurement subtension value for horizontal auto ranging of the target at a third distance;
- a fourth horizontal ranging mark of a fourth angular measurement subtension value for horizontal auto ranging of the target at a fourth distance;
- a grid comprising:
  - one or more aiming marks operationally configured as exact firing marks using ballistic data;
  - one or more first moving target auto ranging marks for auto ranging and auto leading the target running at the first distance;
  - one or more second moving target auto ranging marks for auto ranging and auto leading the target running at the second distance;
  - one or more third moving target auto ranging marks for auto ranging and auto leading the target running at the third distance;
  - one or more fourth moving target auto ranging marks for auto ranging and auto leading the target running at the fourth distance;
- wherein the first horizontal ranging mark and the one or more first moving target auto ranging marks are operationally configured as bullet drop compensation marks at the first distance;
- wherein the second horizontal ranging mark and the one or more second moving target auto ranging marks are operationally configured as bullet drop compensation marks at the second distance;
- wherein the third horizontal ranging mark and the one or more third moving target auto ranging marks are operationally configured as bullet drop compensation marks at the third distance; and
- wherein the fourth horizontal ranging mark and the one or more fourth moving target auto ranging marks are operationally configured as bullet drop compensation marks at the fourth distance.

Embodiment 2. The firearm reticle of Embodiment 1 wherein the first distance includes a distance of or about 300.0 yards, the second distance includes a distance of or about 400.0 yards, the third distance includes a distance of or about 500.0 yards and the fourth distance includes a distance of or about 600.0 yards.

Embodiment 3. The firearm reticle of Embodiment 1 wherein the first horizontal ranging mark subtends 1.0 MRAD, the second horizontal ranging mark subtends 2.0 MRAD, the third horizontal ranging mark subtends 3.0 MRAD, and the fourth horizontal ranging mark subtends 4.0 MRAD from the point of origin aiming mark.

Example 10

In a tenth non-limiting example, a reticle 10 as shown in FIGS. 23-24 may be described in one or more of the following Embodiments 1-5.

Embodiment 1. A reticle for a firearm optical sight for use with one or more firearm/ammo combinations zeroed at one or more distances, comprising:
- a primary horizontal crosshair;
- a primary vertical crosshair;
- a point of origin aiming mark;
- a first horizontal crosshair operationally configured as a 1.0 MRAD subtension mark and operationally configured as a bullet drop compensation mark and a horizontal auto ranging mark of one or more targets at a distance of 300.0 yards;
- a second horizontal crosshair operationally configured as a 2.0 MRAD subtension mark and operationally configured as a bullet drop compensation mark and a horizontal auto ranging mark of the one or more targets at a distance of 400.0 yards;
- a third horizontal crosshair operationally configured as a 3.0 MRAD subtension mark and operationally configured as a bullet drop compensation mark and a horizontal auto ranging mark of the one or more targets at a distance of 500.0 yards;
- a fourth horizontal crosshair operationally configured as a 4.0 MRAD subtension mark and operationally configured as a bullet drop compensation mark and a horizontal auto ranging mark of the one or more targets at a distance of 600.0 yards;
- one or more first target auto ranging marks subtending 1.0 MRAD from the primary horizontal crosshair operationally configured as one or more moving target auto ranging marks, auto lead marks, and bullet drop compensation marks at a distance of 300.0 yards;
- one or more second target auto ranging marks subtending 2.0 MRAD from the primary horizontal crosshair operationally configured as one or more moving target auto ranging marks, auto lead marks, and bullet drop compensation marks at a distance of 400.0 yards;
- one or more third target auto ranging marks subtending 3.0 MRAD from the primary horizontal crosshair operationally configured as one or more moving target auto ranging marks, auto lead marks, and bullet drop compensation marks at a distance of 500.0 yards;
- one or more fourth target auto ranging marks subtending 4.0 MRAD from the primary horizontal crosshair operationally configured as one or more moving target auto ranging marks, auto lead marks, and bullet drop compensation marks at a distance of 600.0 yards; and
- MRAD aiming marks subtending 1.0 MRAD, 2.0 MRAD, 3.0 MRAD and 4.0 MRAD from the primary horizontal crosshair on either side of the primary vertical crosshair.

Embodiment 2. The reticle of Embodiment 1 wherein the angular measurement between the primary vertical crosshair and the one or more first target auto ranging marks is 5.50 MRAD, the angular measurement between the primary vertical crosshair and the one or more second target auto ranging marks is 5.70 MRAD, the angular measurement between the primary vertical crosshair and the one or more third target auto ranging marks is 5.91 MRAD, and the angular measurement between the primary vertical crosshair and the one or more fourth target auto ranging marks is 6.15 MRAD.

Embodiment 3. The reticle of Embodiment 1 wherein the one or more first target auto ranging marks have an angular measurement of 0.92 MRAD, the one or more second target auto ranging marks have an angular measurement of 0.69 MRAD, the one or more third target auto ranging marks have an angular measurement of 0.55 MRAD, and one or more fourth target auto ranging marks have an angular measurement of 0.46 MRAD.

Embodiment 4. The reticle of Embodiment 3 wherein the angular measurement of each of the one or more first target auto ranging marks, the one or more second target auto ranging marks, the one or more third target auto ranging marks, and the one or more fourth target auto ranging marks corresponds to a portion of the one or more targets having a width of or about 25.4 cm (10.0 inches).

Embodiment 5. The reticle of Embodiment 1 wherein the one or more firearm/ammo combinations comprise cartridges selected from the group consisting of a 5.56×45 mm cartridge, a 0.223 cartridge, a 0.308 cartridge, and a 6.5 Creedmoor cartridge.

Example 11

In an eleventh non-limiting example, one or more firearm/ammo combinations including cartridges selected from the group consisting of a 5.56×45 mm cartridge, a 0.223 cartridge, a 0.308 cartridge, and a 6.5 Creedmoor cartridge may be zeroed at a distance effective for use with a reticle 10 of this disclosure including a reticle 10 described in Examples 1-10 and FIGS. 1-25.

Example 12

In an twelfth non-limiting example, a reticle 10 as shown in FIGS. 20-22 and FIGS. 23-24 may be used with the firearm/ammo combinations as provided and described in Tables 6-8 and the firearm/ammo combinations as provided and described in Tables 11-13.

Although the present disclosure is described above in terms of various exemplary embodiments and implementations, it should be understood that the various features and functionality described in one or more of the individual embodiments are not limited in their applicability to the particular embodiment with which they are described, but instead might be applied, alone or in various combinations, to one or more other embodiments whether or not such embodiments are described and whether or not such features are presented as being a part of a described embodiment. Thus, the breadth and scope of the claimed invention should not be limited by any of the above-described embodiments.

Terms and phrases used in this disclosure, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like.

Persons of ordinary skill in the art will recognize that many modifications may be made to the present disclosure without departing from the spirit and scope of the disclosure. The embodiment(s) described herein are meant to be illustrative only and should not be taken as limiting the invention, which is defined in the claims.

I claim:

1. A firearm optical sight reticle for use with one or more firearm/ammo combinations zeroed at one or more distances, comprising:
    a point of origin aiming mark;
    a first horizontal ranging mark of a first angular measurement subtension value below the point of origin aiming mark for horizontal auto ranging of a target at a first distance;
    a second horizontal ranging mark of a second angular measurement subtension value below the point of origin aiming mark for horizontal auto ranging of the target at a second distance;
    a third horizontal ranging mark of a third angular measurement subtension value below the point of origin aiming mark for horizontal auto ranging of the target at a third distance;
    a fourth horizontal ranging mark of a fourth angular measurement subtension value below the point of origin aiming mark for horizontal auto ranging of the target at a fourth distance; and
    a grid comprising:
        one or more aiming marks operationally configured as exact firing marks using ballistic data;
        one or more first moving target auto ranging marks for auto ranging and auto leading the target running at the first distance;
        one or more second moving target auto ranging marks for auto ranging and auto leading the target running at the second distance;
        one or more third moving target auto ranging marks for auto ranging and auto leading the target running at the third distance;
        one or more fourth moving target auto ranging marks for auto ranging and auto leading the target running at the fourth distance;
    wherein the first horizontal ranging mark and the one or more first moving target auto ranging marks are operationally configured as bullet drop compensation marks at the first distance;
    wherein the second horizontal ranging mark and the one or more second moving target auto ranging marks are operationally configured as bullet drop compensation marks at the second distance;
    wherein the third horizontal ranging mark and the one or more third moving target auto ranging marks are operationally configured as bullet drop compensation marks at the third distance; and
    wherein the fourth horizontal ranging mark and the one or more fourth moving target auto ranging marks are operationally configured as bullet drop compensation marks at the fourth distance.

2. The firearm reticle of claim 1 wherein the first distance includes a distance of or about 300.0 yards, the second distance includes a distance of or about 400.0 yards, the third distance includes a distance of or about 500.0 yards and the fourth distance includes a distance of or about 600.0 yards.

3. The firearm reticle of claim 2 wherein the one or more first moving target auto ranging marks have an angular measurement of 0.92 MRAD, the one or more second moving target auto ranging marks have an angular measurement of 0.69 MRAD, the one or more third moving target auto ranging marks have an angular measurement of 0.55

MRAD, and the one or more fourth moving target auto ranging marks have an angular measurement of 0.46 MRAD.

4. The firearm reticle of claim 1 wherein the first horizontal ranging mark subtends 1.0 MRAD, the second horizontal ranging mark subtends 2.0 MRAD, the third horizontal ranging mark subtends 3.0 MRAD, and the fourth horizontal ranging mark subtends 4.0 MRAD from the point of origin aiming mark.

5. The firearm reticle of claim 1 wherein the first angular measurement subtension value, the second angular measurement subtension value, the third angular measurement subtension value, and the fourth angular measurement subtension value are incremental subtension values of angular measurement.

6. The firearm reticle of claim 1 wherein the one or more first moving target auto ranging marks have an angular measurement of 0.92 MRAD, the one or more second moving target auto ranging marks have an angular measurement of 0.69 MRAD, the one or more third moving target auto ranging marks have an angular measurement of 0.55 MRAD, and the one or more fourth moving target auto ranging marks have an angular measurement of 0.46 MRAD.

7. The firearm reticle of claim 1 wherein the grid includes one or more jogging lead marks for the target and one or more walking lead marks for the target.

8. The firearm reticle of claim 7 wherein one or more of the one or more jogging lead marks and one or more of the one or more walking leads marks overlap one or more of the one or more aiming marks.

9. The reticle of claim 1 wherein each of the one or more first moving target auto ranging marks, the one or more second moving target auto ranging marks, the one or more third moving target auto ranging marks, and the one or more fourth moving target auto ranging marks correspond to a portion of the target having a width of or about 25.4 cm (10.0 inches).

10. A firearm optical sight reticle for use with one or more firearm/ammo combinations zeroed at one or more distances, comprising:
- a point of origin aiming mark;
- a first horizontal ranging mark of a 1.0 MRAD subtension value below the point of origin aiming mark for horizontal auto ranging of a target at a first distance;
- a second horizontal ranging mark of a 2.0 MRAD subtension value below the point of origin aiming mark for horizontal auto ranging of the target at a second distance;
- a third horizontal ranging mark of a 3.0 MRAD subtension value below the point of origin aiming mark for horizontal auto ranging of the target at a third distance;
- a fourth horizontal ranging mark of a 4.0 MRAD subtension value below the point of origin aiming mark for horizontal auto ranging of the target at a fourth distance; and
- a grid comprising:
  - one or more aiming marks operationally configured as exact firing marks using ballistic data;
  - one or more first moving target auto ranging marks for auto ranging and auto leading the target running at the first distance;
  - one or more second moving target auto ranging marks for auto ranging and auto leading the target running at the second distance;
  - one or more third moving target auto ranging marks for auto ranging and auto leading the target running at the third distance;
  - one or more fourth moving target auto ranging marks for auto ranging and auto leading the target running at the fourth distance;
- wherein the first horizontal ranging mark and the one or more first moving target auto ranging marks are operationally configured as bullet drop compensation marks at the first distance;
- wherein the second horizontal ranging mark and the one or more second moving target auto ranging marks are operationally configured as bullet drop compensation marks at the second distance;
- wherein the third horizontal ranging mark and the one or more third moving target auto ranging marks are operationally configured as bullet drop compensation marks at the third distance; and
- wherein the fourth horizontal ranging mark and the one or more fourth moving target auto ranging marks are operationally configured as bullet drop compensation marks at the fourth distance.

11. The firearm reticle of claim 10 wherein the first distance includes a distance of or about 300.0 yards, the second distance includes a distance of or about 400.0 yards, the third distance includes a distance of or about 500.0 yards and the fourth distance includes a distance of or about 600.0 yards.

12. A firearm optical sight reticle for use with a plurality of firearm/ammo combinations zeroed at one or more distances, comprising:
- a point of origin aiming mark;
- a first horizontal ranging mark of a first angular measurement subtension value below the point of origin aiming mark for horizontal auto ranging of a target at a first distance;
- a second horizontal ranging mark of a second angular measurement subtension value below the point of origin aiming mark for horizontal auto ranging of the target at a second distance;
- a third horizontal ranging mark of a third angular measurement subtension value below the point of origin aiming mark for horizontal auto ranging of the target at a third distance;
- a fourth horizontal ranging mark of a fourth angular measurement subtension value below the point of origin aiming mark for horizontal auto ranging of the target at a fourth distance; and
- a grid comprising:
  - one or more aiming marks operationally configured as exact firing marks using ballistic data;
  - one or more first moving target auto ranging marks for auto ranging and auto leading the target running at the first distance;
  - one or more second moving target auto ranging marks for auto ranging and auto leading the target running at the second distance;
  - one or more third moving target auto ranging marks for auto ranging and auto leading the target running at the third distance;
  - one or more fourth moving target auto ranging marks for auto ranging and auto leading the target running at the fourth distance;
- wherein the first horizontal ranging mark and the one or more first moving target auto ranging marks are operationally configured as bullet drop compensation marks at the first distance;

wherein the second horizontal ranging mark and the one or more second moving target auto ranging marks are operationally configured as bullet drop compensation marks at the second distance;

wherein the third horizontal ranging mark and the one or more third moving target auto ranging marks are operationally configured as bullet drop compensation marks at the third distance;

wherein the fourth horizontal ranging mark and the one or more fourth moving target auto ranging marks are operationally configured as bullet drop compensation marks at the fourth distance; and wherein the plurality of firearm/ammo combinations include cartridges comprising a 5.56×45 mm cartridge, a 0.223 cartridge, a 0.308 cartridge, and a 6.5 Creedmoor cartridge.

13. The firearm reticle of claim 12 wherein the first distance includes a distance of or about 300.0 yards, the second distance includes a distance of or about 400.0 yards, the third distance includes a distance of or about 500.0 yards and the fourth distance includes a distance of or about 600.0 yards.

14. The firearm reticle of claim 12 wherein the first horizontal ranging mark subtends 1.0 MRAD, the second horizontal ranging mark subtends 2.0 MRAD, the third horizontal ranging mark subtends 3.0 MRAD, and the fourth horizontal ranging mark subtends 4.0 MRAD from the point of origin aiming mark.

\* \* \* \* \*